(12) United States Patent
Payne et al.

(10) Patent No.: US 12,054,207 B2
(45) Date of Patent: Aug. 6, 2024

(54) ADJUSTABLE STEERING STOP

(71) Applicant: CNH Industrial America LLC, New Holland, PA (US)

(72) Inventors: Daniel Payne, Westmont, IL (US); Michael Jensen, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/560,750

(22) Filed: Dec. 23, 2021

(65) Prior Publication Data

US 2023/0202556 A1 Jun. 29, 2023

(51) Int. Cl.
*B62D 5/06* (2006.01)
*B62D 7/18* (2006.01)
*B62D 17/00* (2006.01)

(52) U.S. Cl.
CPC ............ *B62D 5/061* (2013.01); *B62D 7/18* (2013.01); *B62D 17/00* (2013.01)

(58) Field of Classification Search
CPC ... B62D 7/00; B62D 7/18; B62D 7/08; B62D 7/06
See application file for complete search history.

(56) References Cited

U.S. PATENT DOCUMENTS

| | | | | |
|---|---|---|---|---|
| 4,660,845 A * | 4/1987 | Herr | ...... | B62D 5/061 280/93.5 |
| 5,052,528 A * | 10/1991 | Sullivan | ...... | B60G 7/04 267/221 |
| 9,598,104 B1 * | 3/2017 | Lam | ...... | B62D 7/18 |
| 11,597,438 B1 * | 3/2023 | Payne | ...... | B62D 5/061 |
| 2005/0167939 A1 * | 8/2005 | Howard | ...... | B62D 7/228 280/89.11 |
| 2016/0096547 A1 * | 4/2016 | Dames | ...... | B60G 7/001 280/86.758 |
| 2017/0203628 A1 * | 7/2017 | Dames | ...... | B60G 7/001 |
| 2019/0002017 A1 * | 1/2019 | Fay, II | ...... | B62D 5/26 |
| 2021/0179175 A1 * | 6/2021 | Henkel | ...... | B62D 7/18 |
| 2023/0051754 A1 * | 2/2023 | Chang | ...... | B62D 5/001 |
| 2023/0174141 A1 * | 6/2023 | Mauritz | ...... | B62D 7/09 180/411 |

FOREIGN PATENT DOCUMENTS

| | | | | |
|---|---|---|---|---|
| BR | 112013005155 A2 * | 8/2020 | ...... | B60B 35/003 |
| CN | 112356921 A * | 2/2021 | ...... | B60T 1/065 |
| CN | 112498477 A * | 3/2021 | | |
| CN | 113954963 A * | 1/2022 | | |
| CN | 114435025 A * | 5/2022 | | |
| CN | 216783616 U * | 6/2022 | | |

(Continued)

*Primary Examiner* — Nicole T Verley
(74) *Attorney, Agent, or Firm* — Rickard DeMille; Rebecca Henkel

(57) ABSTRACT

An adjustable steering stop includes a chassis stop configured to be coupled to a chassis member of a vehicle and a knuckle stop configured to be coupled to a steering knuckle. The chassis stop and the knuckle stop together define a steering limit location where the knuckle stop contacts the chassis stop. The adjustable steering stop further includes an adjustment actuator coupled to one of the chassis stop or the knuckle stop to move the chassis stop or the knuckle stop thereby changing the steering limit location.

19 Claims, 19 Drawing Sheets

(56) References Cited

FOREIGN PATENT DOCUMENTS

| | | | | | |
|---|---|---|---|---|---|
| DE | 3205979 | C2 | * | 12/1989 | |
| DE | 102006033029 | A1 | * | 1/2008 | ............... B61F 3/16 |
| DE | 102007047787 | A1 | * | 5/2009 | ............... B60G 3/20 |
| DE | 102020006136 | A1 | * | 11/2020 | |
| EP | 603734 | A1 | * | 6/1994 | ............... B60G 7/04 |
| KR | 20230068692 | A | * | 5/2023 | |

* cited by examiner

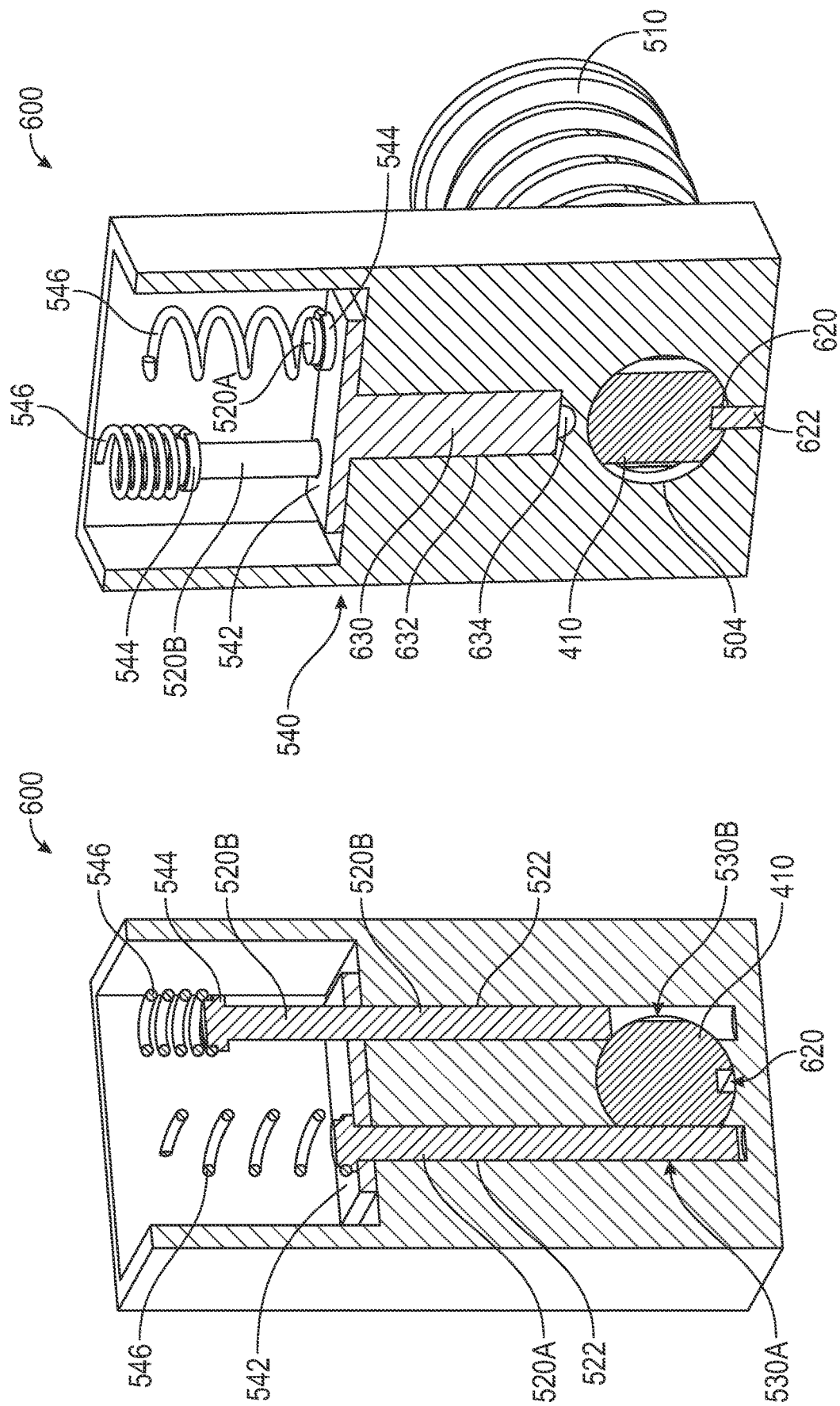

ADJUSTABLE STEERING STOP

BACKGROUND

The present disclosure relates generally to vehicles. More specifically, the present disclosure relates to a steering system for a vehicle.

SUMMARY

One embodiment relates to an adjustable steering stop. The adjustable steering stop includes a chassis stop configured to be coupled to a chassis member of a vehicle and a knuckle stop configured to be coupled to a steering knuckle. The chassis stop and the knuckle stop together define a steering limit location where the knuckle stop contacts the chassis stop. The adjustable steering stop further includes an adjustment actuator coupled to one of the chassis stop or the knuckle stop to move the chassis stop or the knuckle stop thereby changing the steering limit location.

Another embodiment relates to a vehicle. The vehicle includes a chassis and an axle assembly. The axle assembly includes a frame coupled to the chassis, a chassis stop coupled to the frame, a steering knuckle rotatably coupled to the frame and configured to support a tractive element, a knuckle stop coupled to the steering knuckle and positioned to selectively engage the chassis stop to limit rotation of the steering knuckle beyond a steering stop position, and an adjustment actuator coupled to one of the chassis stop or the knuckle stop and configured to move the chassis stop or the knuckle stop to adjust the steering stop position.

Still another embodiment relates to a method. The method includes receiving user inputs from a user interface positioned in a cab of a vehicle, controlling operation of an adjustment actuator based on the user inputs, and moving at least one of a chassis stop or a knuckle stop with the adjustment actuator to adjust a steering limit location.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 11 is a front section view of the stop assembly of FIG. 8.

FIG. 12 is a rear section view of the stop assembly of FIG. 8.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an axle assembly of the present disclosure includes a first stop that is coupled to a chassis portion of the axle assembly and a second stop that is coupled to a steering knuckle of the axle assembly. The steering knuckle is configured to turn relative to the axle to permit steering of a wheel that is coupled to the steering knuckle. The first stop is configured to engage the second stop to prevent rotation of the steering knuckle beyond a steering limit position. At least one of the first steering stop or the second steering stop is selectively repositionable using an actuator. In some embodiments, the actuator selectively locks the steering stop in place. When the actuator is disengaged, the steering stop can be repositioned (e.g., by turning the steering knuckle) by the operator to a desired position. In other embodiments, the actuator actively moves the steering stop to the desired position.

Overall Vehicle

Figure 1:
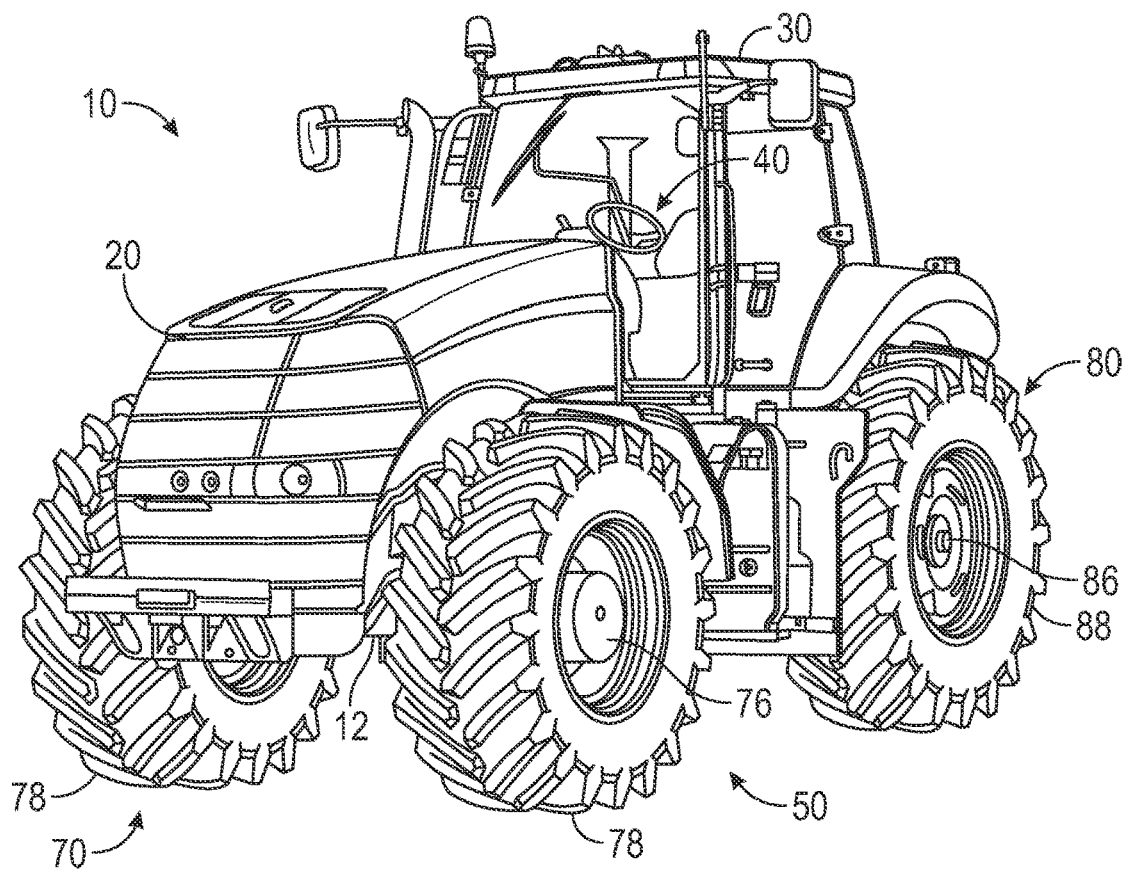
FIG. 1 is a perspective view of a vehicle, according to an exemplary embodiment.
Figure 2:
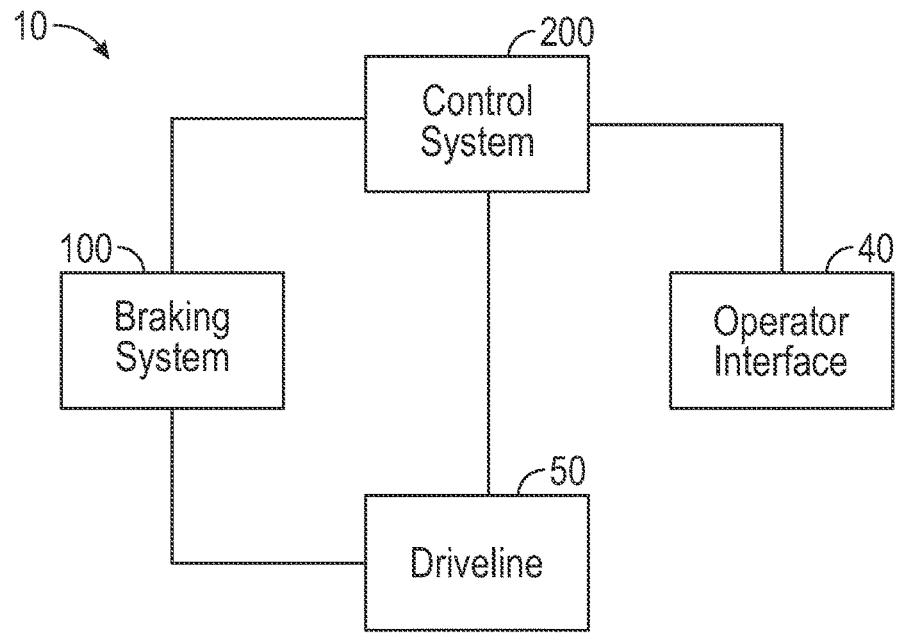
FIG. 2 is a schematic block diagram of the vehicle of FIG. 1, according to an exemplary embodiment.
Figure 3:
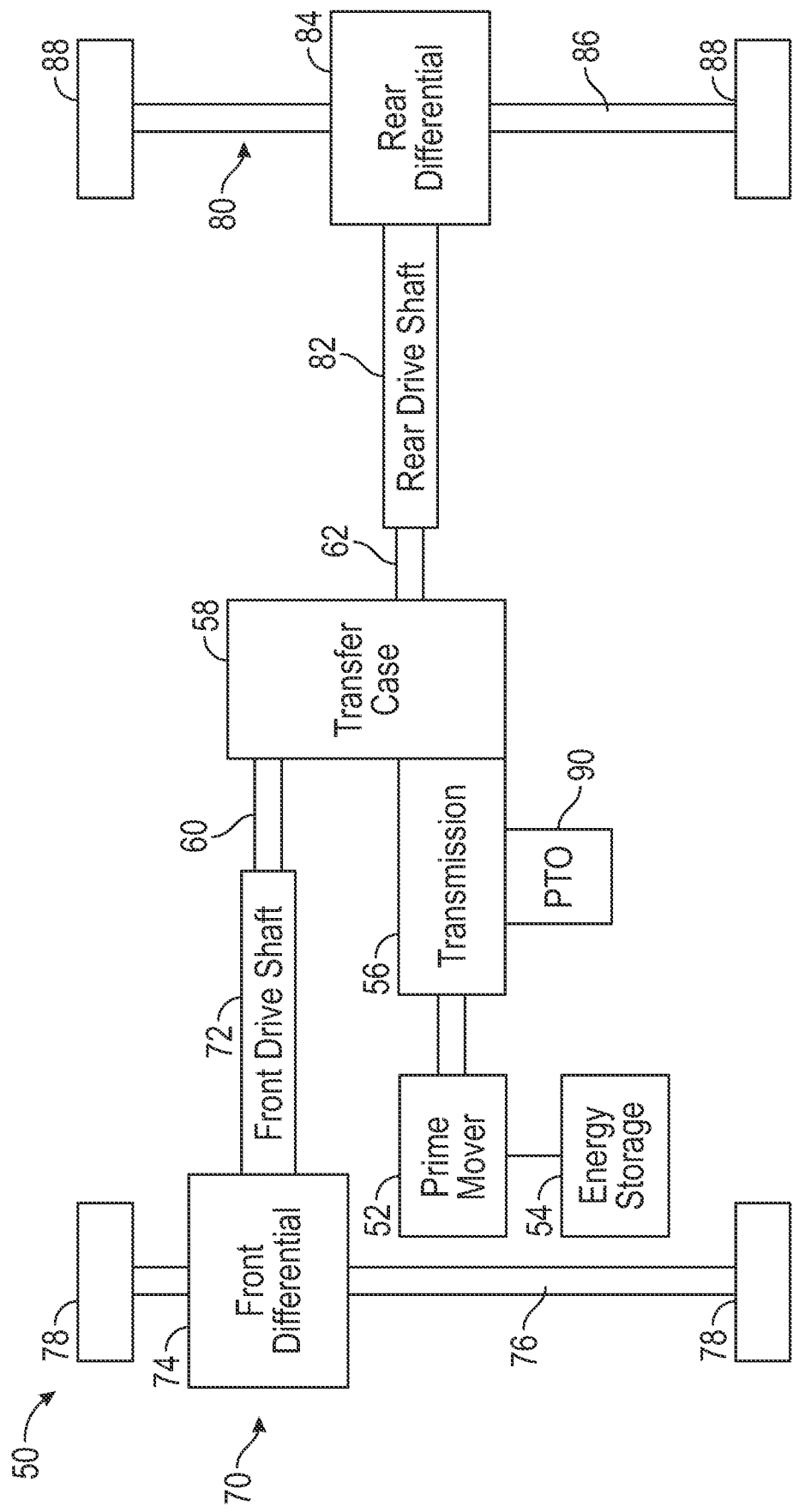
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Axle Assembly

Figure 4:
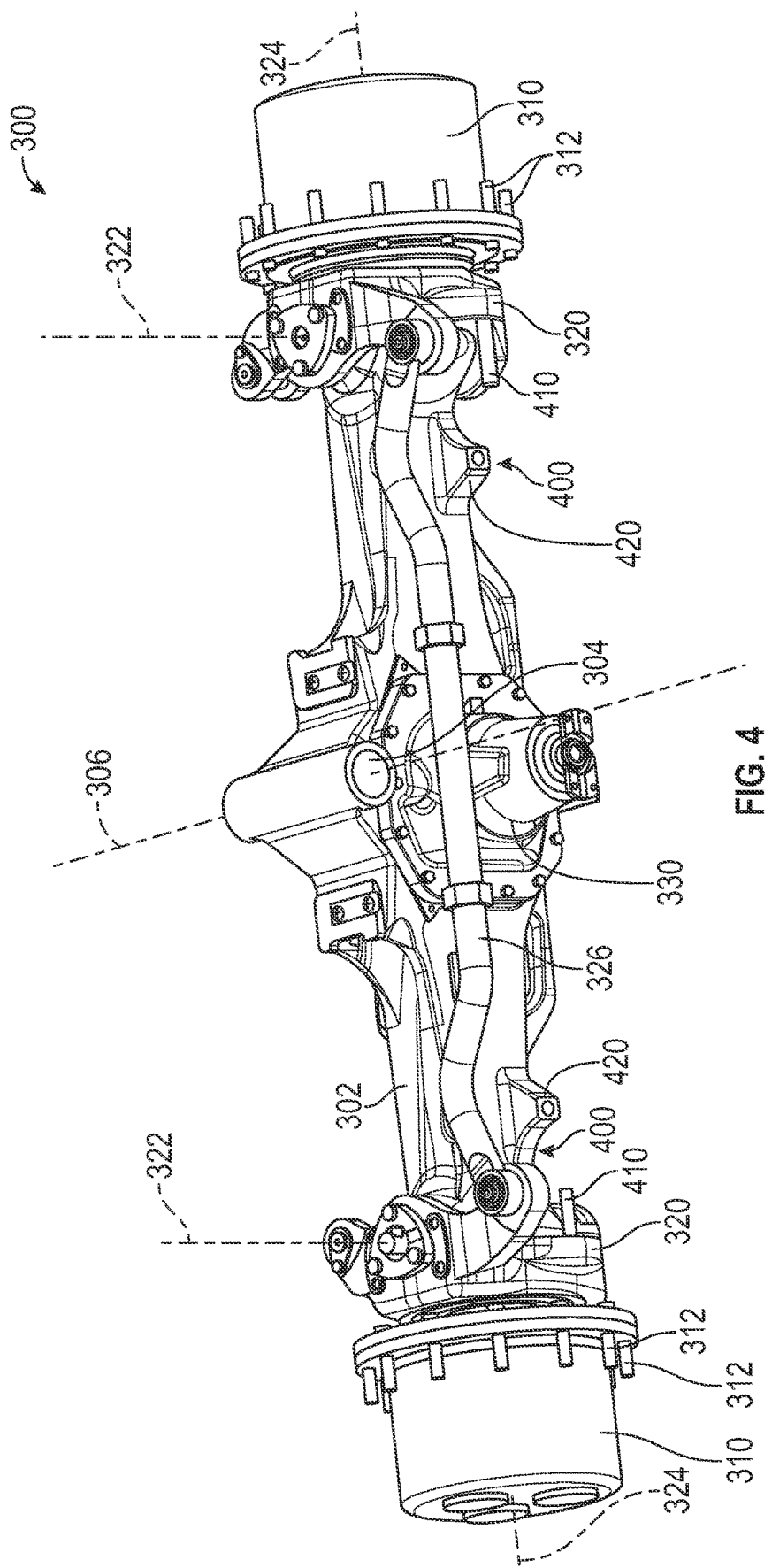
FIGS. 4 and 5 are perspective views of an axle assembly of the driveline of FIG. 3, according to an exemplary embodiment.
Figure 5:
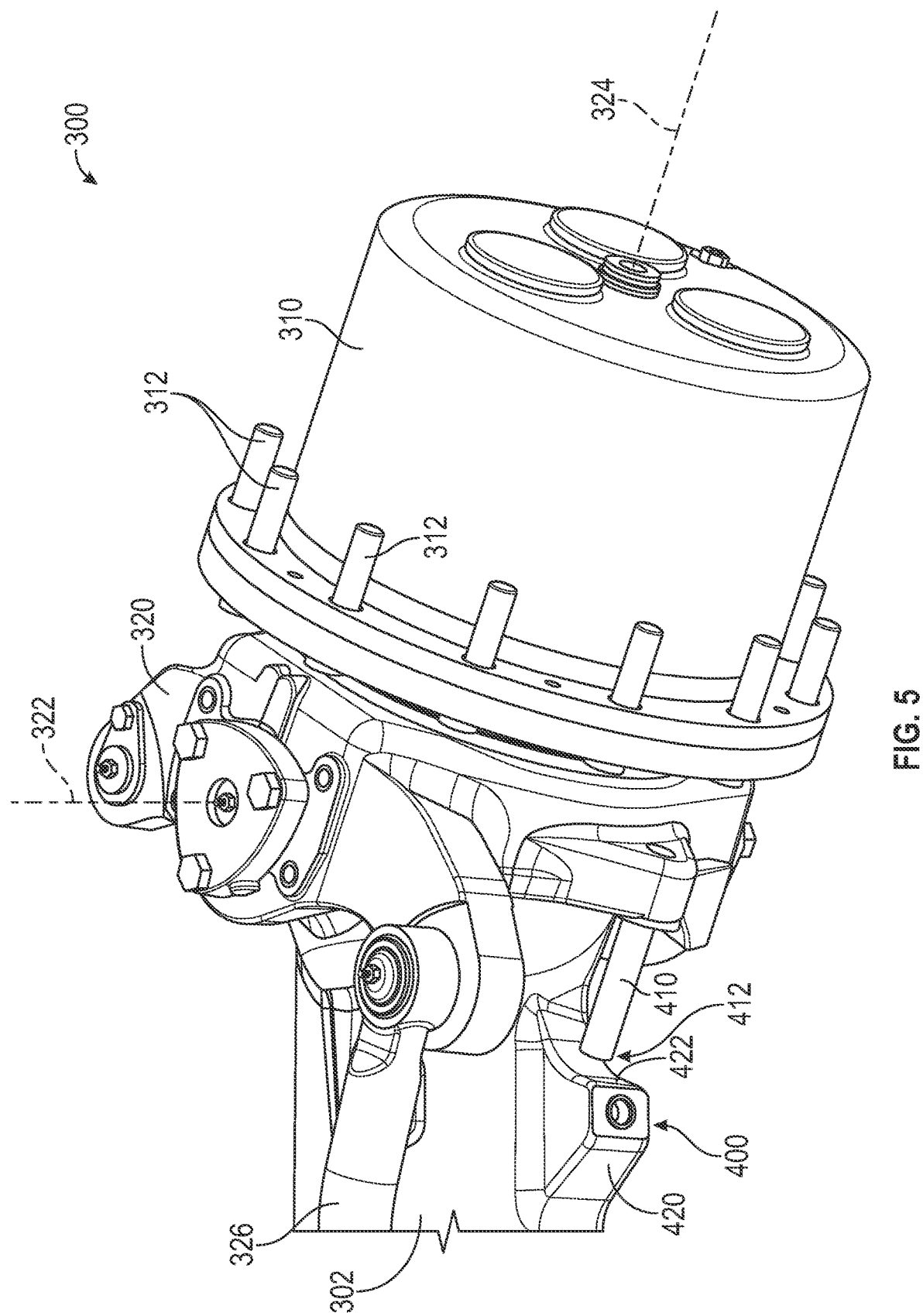

Referring to FIGS. 4 and 5, a steering assembly, steering axle, or tractive assembly, is shown as axle assembly 300. In some embodiments, the axle assembly 300 acts as the front tractive assembly 70 and/or the rear tractive assembly 80. The axle assembly 300 includes a frame or base portion, shown as beam 302. The beam 302 extends laterally across the vehicle 10. The beam 302 may be pivotally coupled to the frame 12 of the vehicle 10. As shown, the beam 302 defines a passage or aperture, shown as pivot pin passage 304, extending longitudinally therethrough. Specifically, the pivot pin passage 304 is centered about a longitudinal axis 306 extending longitudinally relative to the vehicle 10. A pin may extend from the frame 12 of the vehicle 10 into the pivot pin passage 304 to pivotally couple the beam 302 to the frame 12. In such a configuration, the beam 302 may rotate relative to the frame 12 about the longitudinal axis 306. However, as rotation of the axle assembly 300 about the longitudinal axis 306 may not affect steering, the beam 302 may be considered to be part of the frame 12 (e.g., a chassis portion, a frame portion, etc.) for purposes of discussion herein.

The axle assembly 300 includes a pair of wheel end assemblies or wheel hubs, shown as wheel ends 310. The wheel ends 310 are positioned on opposite ends of the beam 302. Each wheel end 310 is configured to be removably coupled to a tractive element or wheel (e.g., a front tractive element 78, a rear tractive element 88). Specifically, each wheel end 310 includes a series of threaded studs, shown as studs 312, that extend outward from a flange. The studs 312 may extend through corresponding apertures defined by a wheel to couple the wheel to the corresponding wheel end 310.

Each wheel end 310 is coupled to the beam 302 by a pair of steering members or turning members, shown as knuckles 320. Specifically, each knuckle 320 is pivotally coupled to an end of the beam 302, such that the knuckle 320 is rotatable relative to the beam 302 about a substantially vertical axis, shown as steering axis 322. The steering axes 322 are laterally offset from one another. Each wheel end 310 is rotatably coupled to a knuckle 320, such that the wheel end 310 is rotatable relative to the knuckle 320 about a substantially horizontal axis, shown as wheel axis 324. Accordingly, each wheel end 310 is rotatable about the corresponding wheel axis 324 to drive the vehicle 10. Each wheel end 310 and the corresponding knuckle 320 are rotatable about the corresponding steering axis 322 to steer the vehicle 10.

In some embodiments, a connecting rod 326 is pivotally coupled to each of the knuckles 320 and extends laterally across the axle assembly 300. The connecting rod 326 is configured to coordinate rotation of the knuckles 320 such that the rotation of the knuckles 320 relative to one another is limited. The connecting rod 326 may have an adjustable length to vary a toe angle of the wheel ends 310.

In some embodiments, the axle assembly 300 is a driven axle such that the wheel ends 310 receive rotational mechanical energy one or more drivers (e.g., the prime mover 52) to propel the vehicle 10. As shown, the axle assembly 300 includes a differential 330 (e.g., the front differential 74, the rear differential 84, etc.) that distributes a rotational mechanical energy input to the wheel ends 310. In some embodiments, the differential 330 is coupled to the beam 302. The differential 330 may be coupled to the wheel ends 310 by a pair of axle shafts (e.g., the front axle 76, the rear axle 86, etc.).

Adjustable Steering Stops

As the tractive elements (e.g., wheels) turn to steer the vehicle 10, a distance between each tractive element and the body 20 changes. It may be desirable to maximize the steering angle range of the axle assembly 300 to accommodate sharp turns and a tight turning radius. However, if the tractive elements are turned too far away from the center position, the tractive elements may come into contact with the body 20. This is undesirable, as the tractive elements may scrub against the body 20, causing damage to the body 20 and/or the tractive elements. To prevent the tractive elements from contacting the body, the axle assembly 300 includes a pair of adjustable steering stop assemblies or steering limiting assemblies, shown as stop assemblies 400. The stop assemblies 400 limit the steering angle range of the wheel ends 310 (i.e., the angle through which the wheel ends 310 are permitted to rotate about the steering axes 322) and the corresponding tractive elements to a range that does not permit the tractive elements to scrub.

In certain situations, the tractive elements of the vehicle 10 may be reconfigured to be better suited to performing certain tasks. By way of example, crops may have certain associated row widths (e.g., the distance between adjacent rows of corn may be different than the distance between adjacent rows of soy beans). A vehicle 10 configured as a planter may require wheels that can be adjusted to vary the track width to suit whatever crop is currently being planted. By way of example, an operator may add or remove wheel spacers to change the track width of the vehicle 10 in preparation for switching crops. By way of another example, the vehicle 10 may be reconfigured with tractive elements having different widths and/or diameters.

After reconfiguring the tractive elements, the tractive elements may contact the body 20 at a different rotational position, changing the desired steering angle range. By way of example, decreasing the track width of the tractive elements may cause the tractive elements to contact the body 20 at a narrower steering angle (e.g., an angle closer to a center position). In such a configuration, it may be desirable for the stop assemblies 400 to limit the steering angle range to a narrower range to avoid scrubbing. By way of another example, increasing the track width of the tractive elements may cause the tractive elements to contact the body 20 at a wider steering angle (e.g., an angle farther from the center position). In such a configuration, it may be desirable for the stop assemblies 400 to expand the steering angle range to a wider range to minimize the turning radius and improve steering performance. In order to accommodate both of these situations, the stop assemblies 400 may be adjustable to permit an operator to selectively vary the steering angle range.

Referring still to FIGS. 4 and 5, the axle assembly 300 further includes a pair of adjustable steering stop assemblies or steering limiting assemblies, shown as stop assemblies 400, each associated with a knuckle 320 and the corresponding end of the beam 302. Each stop assembly 400 includes a first portion, shaft, bumper, limiter, stop, or contact, shown as knuckle stop 410, and a second portion, bumper, limiter, stop, or contact, shown as beam stop 420. The knuckle stop 410 is coupled to the knuckle 320 and includes an end portion, projection, or protrusion, shown as stop end 412. The beam stop 420 is coupled to the beam 302 and includes a contact surface, shown as contact surface 422. As movement of the beam 302 about the longitudinal axis 306 does not affect the steering angle, the beam stop 420 may be considered a chassis stop or frame stop that is coupled to the frame 12. The knuckle stop 410 extends inward from the knuckle 320 toward the contact surface 422.

In operation, the stop assemblies 400 limit the steering rotation of the wheel ends 310 (i.e., rotation of the wheel ends 310 about the steering axes 322) and the corresponding wheels. One of the stop assemblies 400 (e.g., a left stop assembly) is positioned on a first end (e.g., a left end) of the beam 302 and limits rotation of the wheel ends 310 in a first direction (e.g., to the right). Specifically, when the wheel ends 310 have reached a far right, maximum right, or right stop position (e.g., a right steering limit position, a right steering limit location, etc.), the stop end 412 of the knuckle stop 410 engages the contact surface 422 of the beam stop 420, preventing further movement of the wheel ends 310 to the right. Similarly, the other of the stop assemblies 400 (e.g., a right stop assembly) is positioned on a second end (e.g., a right end) of the beam 302 and limits rotation of the wheel ends 310 in a second direction (e.g., to the left). Specifically, when the wheel ends 310 have reached a far left, maximum left, or left stop position (e.g., a left steering limit location, a left steering limit position, etc.), the stop end 412 of the knuckle stop 410 engages the contact surface 422 of the beam stop 420, preventing further movement of the wheel ends 310 to the left.

For each stop assembly 400, the location of the corresponding stop position is dictated by (a) the position of the contact surface 422 relative to the beam 302 and (b) the position of the stop end 412 relative to the knuckle 320. Accordingly, the positions of the knuckle stop 410 and/or the beam stop 420 may be adjusted to control the locations of the stop positions. By way of example, if the beam stop 420 were moved relative to the beam 302 such that the contact surface 422 were positioned closer to the knuckle 320, the knuckle stop 410 would engage the beam stop 420 sooner (e.g., at a less severe angle, with the wheel ends 310 angled closer toward a center, straight position), and the rotation of the wheel ends 310 about the steering axes 322 would be further limited. By way of another example, if the knuckle stop 410 were moved relative to the knuckle 320 such that the stop end 412 were positioned closer to the beam stop 420, the knuckle stop 410 would engage the beam stop 420 sooner (e.g., at a less severe angle, with the wheel ends 310 angled closer toward a center, straight position), and the rotation of the wheel ends 310 about the steering axes 322 would be further limited.

In some embodiments, the knuckle stop 410 is adjustable to vary the steering angle range of the wheel ends 310. The knuckle stop 410 is elongate (e.g., a cylinder), with the stop end 412 being positioned distal from the knuckle 320. A length of the knuckle stop 410 extends from an end of the knuckle stop 410 that is coupled to the knuckle 320 to the stop end 412. The knuckle stop 410 may be adjusted by translating the knuckle stop 410 along the length of the knuckle stop 410, such that the distance between the knuckle 320 and the stop end 412 varies.

In some embodiments, the contact surface 422 of the beam stop 420 is curved (e.g., arcuate) or angled. By angling the contact surface 422 relative to the beam 302, the knuckle stop 410 may engage the contact surface 422 at a different contact position for each adjusted length of the knuckle stop 410. By way of example, if the distance between the stop end 412 and the knuckle 320 is a first length, the knuckle stop 410 engages the contact surface 422 at a first contact position. If the distance between the stop end 412 and the knuckle 320 is a second length different from the first length, the knuckle stop 410 engages the contact surface 422 at a second contact position different from the first contact position. Accordingly, by angling the contact surface 422 relative to the beam 302, the knuckle stop 410 can remain approximately perpendicular to the contact surface 422 at the contact point for a variety of different lengths of the knuckle stop 410.

In some embodiments, the beam stop 420 is adjustable to vary the steering angle range of the wheel ends 310. The beam stop 420 and the knuckle stop 410 may both be adjustable, or only one of the beam stop 420 and the knuckle stop 410 may be adjustable. The beam stop 420 may be adjusted by translating the beam stop 420 relative to the beam 302, such that the distance between the contact surface 422 and the stop end 412 varies. Additionally or alternatively, the beam stop 420 may be adjusted by rotating the contact surface 422 relative to the beam 302, such that the distance between the contact surface 422 and the stop end 412 varies.

Steering Stop Control System

Figure 6:
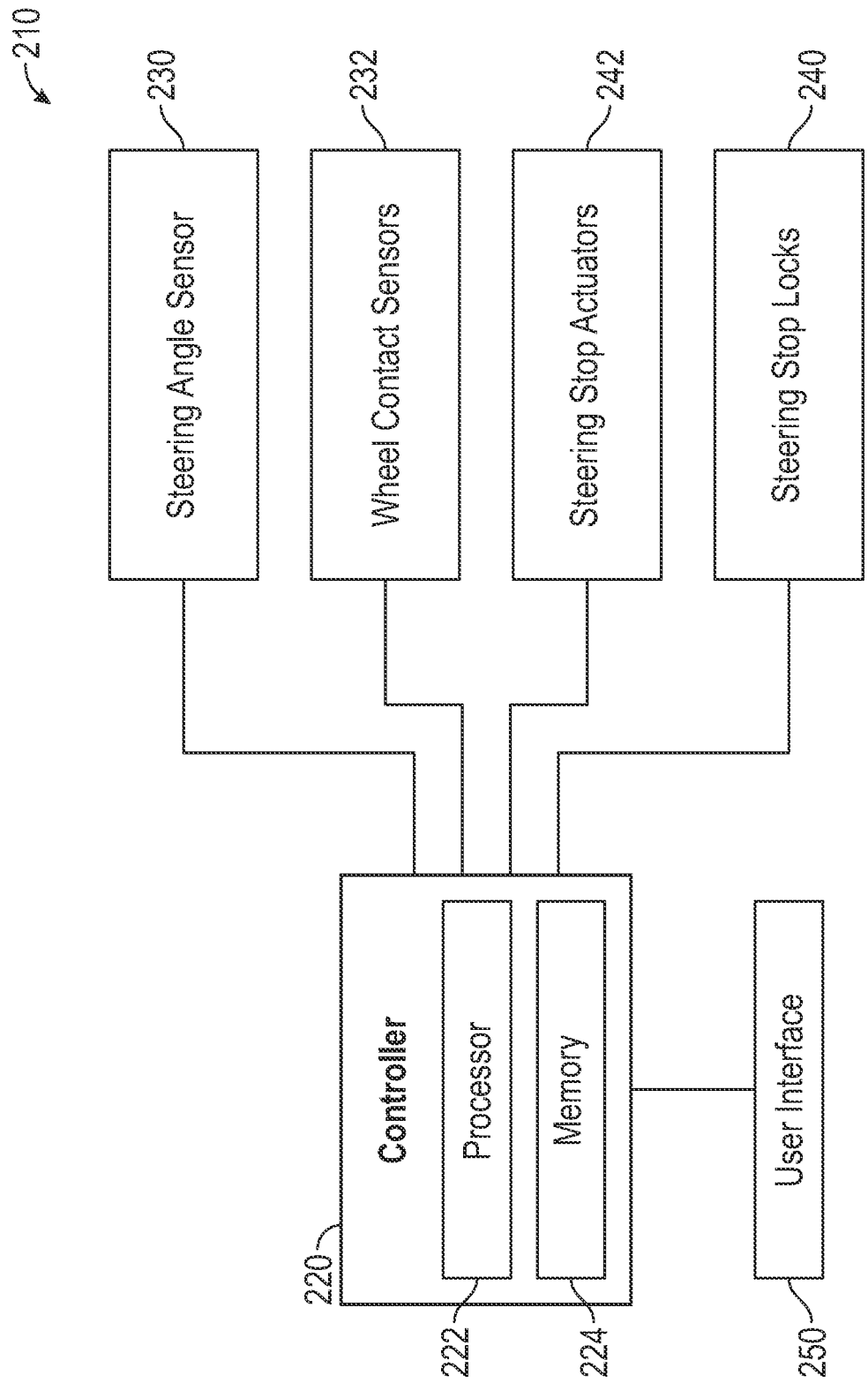
FIG. 6 is a schematic block diagram of a control system of the vehicle of FIG. 1, according to an exemplary embodiment.

Referring to FIG. 6, a control subsystem or steering stop control system is shown as stop control system 210. The stop control system 210 includes a processing circuit, shown as controller 220. The controller 220 may be configured to control operation of the stop assemblies 400 (e.g., in response to a user input, in response to a sensor input, etc.). The controller 220 includes a processing circuit, shown as processor 222, in communication with a memory device, shown as memory 224. The memory 224 may contain one or more instructions that, when executed by the processor 222, cause the processor to perform one or more of the actions described herein.

The stop control system 210 further includes one or more first sensors, shown as steering angle sensor 230, that is operatively coupled to the controller 220. The steering angle sensor 230 is configured to provide a signal indicating of the current steering angle (e.g., the angular distance between the current steering orientation of the wheel ends 310 and the center position). The steering angle sensor 230 may measure the steering angle directly. By way of example, the steering angle sensor 230 may be coupled to one of the knuckles 320 and configured to measure an orientation of the knuckle 320. Additionally or alternatively, the steering angle sensor 230 may measure the steering angle indirectly. By way of example, the steering angle sensor 230 may measure a position of a steering wheel within the cab 30. The steering angle sensor 230 may include one or more potentiometers, encoders, limit switches, or other sensors.

The stop control system 210 further includes a pair of second sensors, shown as wheel contact sensors 232, that are operatively coupled to the controller 220. The wheel contact sensors 232 are configured to provide signals indicating when one of the wheels (or other tractive elements) is in contact with the body 20. By way of example, one or both of the wheel contact sensors 232 may provide a first signal indicating that the wheels have been turned sufficiently far to the left that one or both of the wheels are in contact with the body 20. One or both of the wheel contact sensors 232 may provide as second signal indicating that the wheels have been turned sufficiently far to the right that one or both of the wheels are in contact with the body 20. In some embodiments, each wheel contact sensor 232 is positioned along the body 20 such that the wheel contact sensor 232 is engaged by the wheel when the wheel is near the body 20 or in contact with the body 20. By way of example, the wheel contact sensor 232 may include a bar that is positioned to be contacted by the wheel and a limit switch coupled to the bar. The bar may depress the limit switch when contacted by the wheel. In some embodiments, the wheel contact sensor 232 extends longitudinally and/or vertically along the body 20 such that the wheel contact sensor 232 can be contacted by a variety of different wheel diameters, thicknesses, and track widths.

The stop control system 210 further includes a pair of first actuators or locking assemblies, shown as steering stop locks 240, that are operatively coupled to the controller 220. Each steering stop lock 240 is configured to selectively fix a steering stop in place. By way of example, the steering stop lock 240 may selectively fixedly couple a knuckle stop 410 to the corresponding knuckle 320. By way of another example, the steering stop lock 240 may selectively fixedly couple a beam stop 420 to the beam 302. In operation, the steering stop lock 240 may be disengaged to permit movement of the corresponding steering stop, and a user may adjust the steering stop to the desired position. Once in the desired position, the steering stop lock 240 may be engaged to fix the steering stop in place. If the user should choose to again adjust the position of the steering stop, the steering stop lock 240 may once again be disengaged. In some embodiments, the steering stop lock 240 is controlled by the controller 220. In other embodiments, the steering stop lock 240 is directly, manually controlled without use of the controller 220.

The stop control system 210 further includes a pair of second actuators, shown as steering stop actuators 242, that are operatively coupled to the controller 220. The stop control system 210 may include the steering stop locks 240 and the steering stop actuators 242 or only one of the steering stop locks 240 or the steering stop actuators 242. Each steering stop actuator 242 is configured to selectively reposition the corresponding steering stop. By way of example, the steering stop actuator 242 may selectively translate a knuckle stop 410 relative to the corresponding knuckle 320. By way of another example, the steering stop actuator 242 may selectively translate and/or rotate a beam stop 420 relative to the beam 302. In operation, the steering stop actuator 242 may be actuated to move the corresponding steering stop to the desired position. In some embodiments, the steering stop actuator 242 includes a sensor that provides positional feedback to facilitate moving the steering stop to the desired position. In some embodiments, the steering stop actuator 242 is controlled by the controller 220. In other embodiments, the steering stop actuator 242 is directly, manually controlled without use of the controller 220.

The stop control system 210 further includes an input device and/or output device, shown as user interface 250, that is operatively coupled to the controller 220. The user interface 250 may be used by one or more users (e.g., operators) to control operation of the vehicle 10, including the stop assemblies 400. The user interface 250 may include one or more input devices configured to receive an input from the user. By way of example, the user interface 250 may include one or more switches, knobs, dials, styluses, touch screens, microphones, or other input devices. The user interface 250 may include one or more output devices configured to provide information to the user. By way of example, the user interface 250 may include one or more screens, lights, speakers, haptic feedback devices, or other output devices. In some embodiments, the user interface 250 is positioned within the cab 30, such that the user can interact with the user interface 250 to control the vehicle 10 while positioned within the cab 30.

Locking Steering Stop

Figure 7:
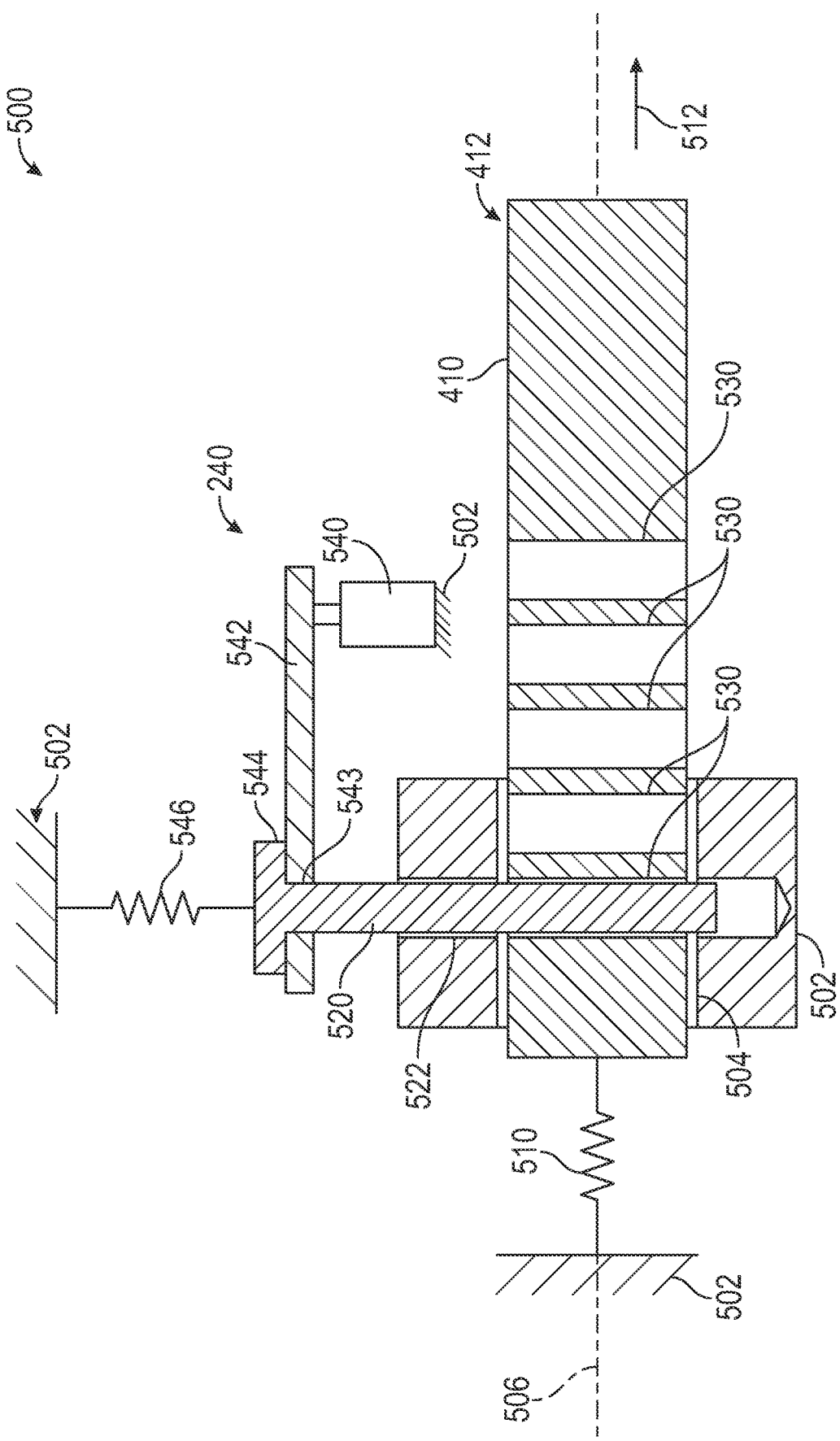
FIG. 7 is a section view of a stop assembly of the axle assembly of FIG. 4, according to an exemplary embodiment.

Referring to FIG. 7, a locking steering stop assembly is shown as stop assembly 500 according to an exemplary embodiment. The stop assembly 500 may make up a portion of the stop assembly 400. As shown, the stop assembly 500 is configured to permit selective adjustment of the knuckle stop 410.

The stop assembly 500 includes a base, fixed portion, support, or frame portion, shown as base 502. In some embodiments, the base 502 is fixedly coupled to one of the knuckles 320. In other embodiments, the base 502 is integrally formed as a single continuous piece with the knuckle 320. The knuckle 320 is configured to support the other components of the stop assembly 500. The base 502 defines a passage, aperture, or recess, shown as stop passage 504, extending ate least partially though the base 502. The knuckle stop 410 is received within the stop passage 504, slidably coupling the knuckle stop 410 to the base 502. The knuckle stop 410 is repositionable along an axis 506 that extends along the length of the stop passage 504 and that is centered about the stop passage 504.

The stop assembly 500 further includes a biasing element, shown as spring 510, that is coupled to the base 502 and to the knuckle stop 410. The spring 510 is configured to apply a biasing force on the knuckle stop 410 to bias the knuckle stop 410 in an extension direction 512 that is parallel to the axis 506. The extension direction 512 extends outward from the base 502 such that the stop end 412 is biased away from the base 502 and toward the beam stop 420.

The stop assembly 500 includes the steering stop lock 240. As shown, the steering stop lock 240 includes a detent element, pin, bar, or shear member, shown as lock pin 520. The base 502 defines an aperture, recess, or passage, shown as lock pin passage 522, that extends at least partway through the base 502 and intersects the stop passage 504. In some embodiments, the lock pin passage 522 extends on only one side of the stop passage 504. In such embodiments, the lock pin passage 522 extends on both sides of the stop passage 504.

The lock pin 520 is received within the lock pin passage 522 such that the lock pin 520 is slidably coupled to the base 502. The lock pin 520 is selectively repositionable along the lock pin passage 522 between a first, engaged, or locked positon (e.g., corresponding to a locked configuration of the stop assembly 500), shown in FIG. 7, and a second, disengaged, or unlocked position (e.g., corresponding to an unlocked configuration of the stop assembly 500). In the locked position, the lock pin 520 extends at least partway across the stop passage 504. In embodiments where the lock pin passage 522 extends on only one side of the stop passage 504, the lock pin 520 may extend only partway across the stop passage 504 in the locked position. In embodiments where the lock pin passage 522 extends on both sides of the stop passage 504, the lock pin 520 may extend across the entirety of the stop passage 504 and into both portions of the lock pin passage 522 in the locked position, as shown in FIG. 7.

The knuckle stop 410 defines a series of detent structures, apertures, recesses, notches, grooves, or passages, shown as detents 530. The detents 530 are offset from one another along the axis 506 such that the detents 530 are each located at different longitudinal positions along the length of the knuckle stop 410. The detents 530 are positioned to align with the lock pin passage 522, based on the current longitudinal position of the knuckle stop 410. By way of example, the knuckle stop 410 may define five detents 530, each at a different position along the length of the knuckle stop 410. Due to the longitudinal offsets between the detents 530, only one of the detents 530 aligns with the lock pin passage 522 at any given time. Which of the detents 530 aligns with the lock pin passage 522 depends on the current longitudinal position of the knuckle stop 410. Accordingly, the first detent 530 aligns with the lock pin passage 522 when the knuckle stop 410 is in a first longitudinal position, the second detent 530 aligns with the lock pin passage 522 when the knuckle stop 410 is in a second longitudinal position, the third detent 530 aligns with the lock pin passage 522 when the knuckle stop 410 is in a third longitudinal position, etc.

The lock pin 520 may be repositioned to selectively limit (e.g., prevent, lock) movement of the knuckle stop 410 relative to the base 502. When the lock pin 520 is in the unlocked position, the lock pin 520 may be retracted such that the lock pin 520 does not obstruct movement of the knuckle stop 410, and the knuckle stop 410 may be free to move longitudinally relative to the base 502. When the lock pin passage 522 aligns with one of the detents 530, the lock pin 520 may be moved to the locked position (e.g., as shown in FIG. 7). In the locked position, the lock pin 520 extends from the lock pin passage 522 and into or through the detent 530. Accordingly, the lock pin 520 engages both the portion of the base 502 that defines the lock pin passage 522 and the portion of the knuckle stop 410 that defines the detent 530, pinning the knuckle stop 410 in place (e.g., fixedly coupling the knuckle stop 410 to the base 502).

To reposition the knuckle stop 410, the lock pin 520 may be moved to the unlocked position, freeing the knuckle stop 410. The knuckle stop 410 may be moved to the desired longitudinal position. The knuckle stop 410 may then be moved back into the locked position, locking the knuckle stop 410 in place.

To facilitate control over the position of the lock pin 520, the steering stop lock 240 may include an actuator, shown as lock pin actuator 540, that is configured to selectively reposition the lock pin 520 between the locked position and the unlocked position. A portion of the lock pin actuator 540 may be coupled to the base 502. In some embodiments, the lock pin actuator 540 is a linear actuator, such as a hydraulic cylinder, a pneumatic cylinder, a solenoid, or a linear actuator driven by an electric motor.

Figure 9:
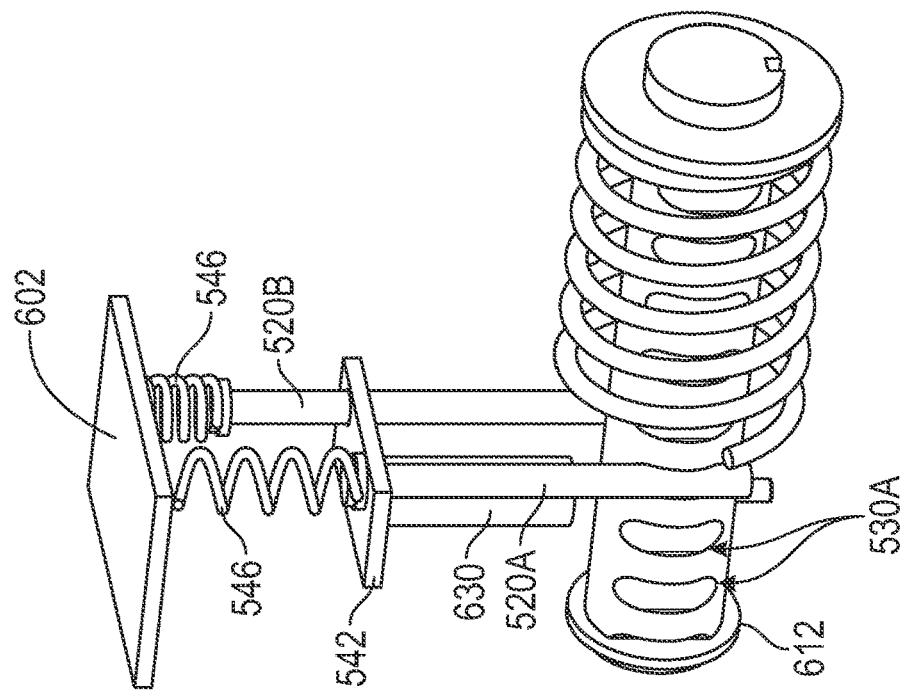
FIGS. 8 and 9 are perspective views of a stop assembly of the axle assembly of FIG. 3, according to another exemplary embodiment.
Figure 8:
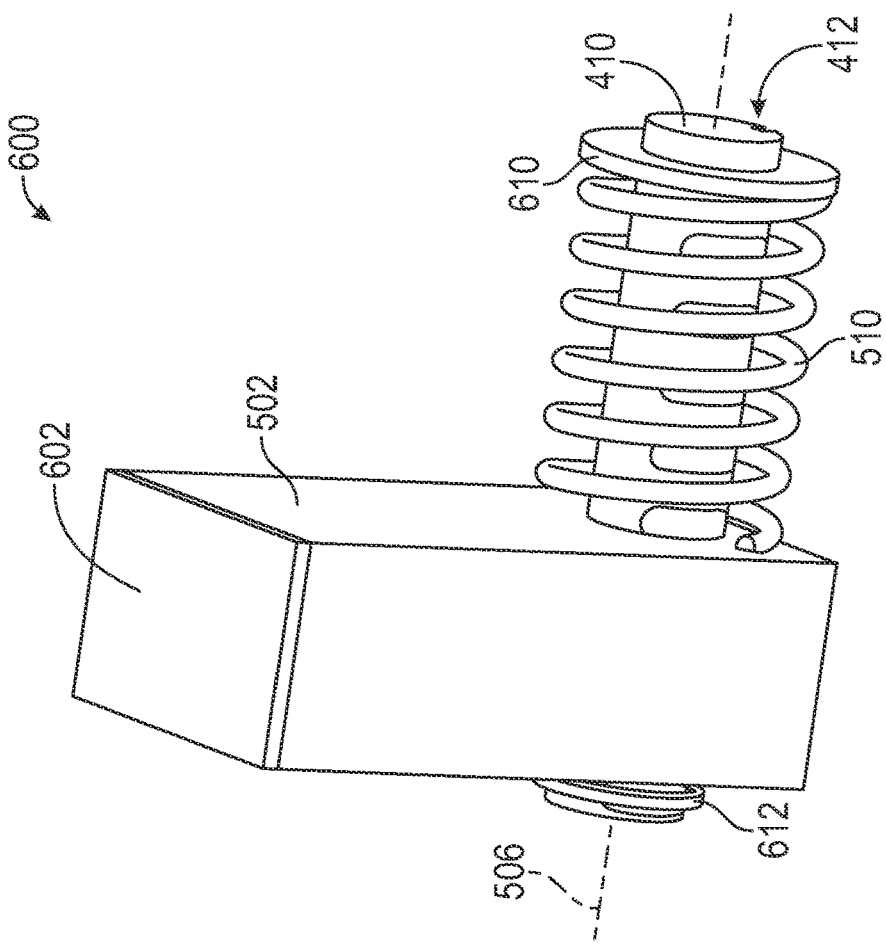

The lock pin actuator 540 is coupled to the lock pin 520 by a coupler, shown as plate 542. As shown, the lock pin actuator 540 is offset from the lock pin 520, and the plate 542 extends between the lock pin actuator 540 and the lock pin 520. The plate 542 defines an aperture, shown as pin aperture 543, that receives the lock pin 520 therethrough. The plate 542 engages a head 544 (e.g., a collar, an annular protrusion) of the lock pin 520 to couple the lock pin 520 to the plate 542. The plate 542 may facilitate positioning the lock pin actuator 540 in a location that permits a more compact overall size of the stop assembly 500. The plate 542 may also facilitate coupling multiple lock pins 520 to the lock pin actuator 540 (e.g., as shown in FIG. 9).

The steering stop lock 240 further includes a biasing element, shown as spring 546, that is coupled to the base 502 and to the head 544 of the lock pin 520. The spring 546 is configured to apply a biasing force on the lock pin 520 to bias the lock pin 520 toward the locked position. The plate 542 is positioned on an underside of the head 544, opposite the spring 546. The lock pin actuator 540 may extend to overcome the biasing force of the spring 546 and move the lock pin 520 toward the unlocked position. If the lock pin actuator 540 stops applying this unlock force, the biasing force of the spring 546 will move the lock pin 520 back to the locked position. Accordingly, the steering stop lock 240 is actuated to an unlocked configuration and spring biased to a locked configuration. This may be a desirable configuration, as the steering stop lock 240 would remain in the desired position if the lock pin actuator 540 were to fail. In other embodiments, the steering stop lock 240 is spring biased to the unlocked configuration and actuated to the locked configuration.

Locking Steering Stop—Operation

In operation, the controller 220 may utilize the steering stop lock 240 of the stop assembly 500 to adjust the stop position associated with the stop assembly 400. After installing a new set of wheels, the user may wish to adjust the right and left stop positions to prevent the wheels scrubbing against the body 20 while maximizing the turning radius of the vehicle 10. To accomplish this, the controller 220 may activate the lock pin actuator 540 to move the lock pin 520 to the unlocked position. By way of example, the user may interact with (e.g., press a button of) the user interface 250 command the steering stop lock 240 to unlock the knuckle stop 410.

With the lock pin 520 in the unlocked position, the knuckle stop 410 may move freely along the stop passage 504 (e.g., along the axis 506). The spring 510 may bias the knuckle stop 410 outward until either (a) the knuckle stop 410 engages the beam stop 420 or (b) the knuckle stop 410 reaches a fully extended position. The user may adjust the steering angle of the wheels to the desired stop position. Once in the desired stop position, the controller 220 may deactivate the lock pin actuator 540, causing the lock pin 520 to be moved toward the locked position by the spring 546. If the lock pin 520 is aligned with one of the detents 530, the lock pin 520 may enter the detent 530 and lock the knuckle stop 410 in place. If the lock pin 520 is not aligned with one of the detents 530, the spring 546 may bias the lock pin 520 into engagement with an outer surface of the knuckle stop 410. The knuckle stop 410 may then be moved slightly (e.g., due to movement of the wheels) until the lock pin 520 aligns with one of the detents 530. Increasing the density of the detents (e.g., decreasing the distance between the detents 530) may facilitate increasing the adjustment resolution provided by the knuckle stop 410 (e.g., the degree of adjustability of the stop assembly 400).

The desired stop position may be determined in a variety of different ways. In some embodiments, the user manually determines the desired stop position by eye and indicates the desired stop position through the user interface 250. In such an embodiment, the user selection of the desired stop position may inherently account for a variety of vehicle parameters (e.g., track width, wheel diameter, wheel thickness, etc.).

In other embodiments, the wheel contact sensors 232 may be used to determine the desired stop position. By way of example, the user may turn the wheels until one of the wheels engages a wheel contact sensor 232, indicating that the wheel is near contact with the body 20 or in contact with the body 20. This indication may be considered an indication of a vehicle parameter, such as the position at which the wheel contacts the body. The controller 220 may determine the desired stop position based on this indication from the wheel contact sensor 232. By way of example, in response to the indication from the wheel contact sensor 232, the controller 220 may instruct the user (e.g., through the user interface 250) to adjust the wheels a small distance (e.g., 1 degree, 2 degrees, etc.) closer to the center position. Once the wheels have been adjusted the small distance (e.g., as measured by the steering angle sensor 230, as indicated by an input from the operator through the user interface 250), the controller 220 may set the current steering angle as the desired stop position, and the controller 220 may control the steering stop lock 240 to lock the knuckle stop 410.

In other embodiments, the controller 220 may determine the desired stop position based on one or more vehicle parameters input by the user. By way of example, the user may input (e.g., through the user interface 250) one or more vehicle parameters related to a configuration of the tractive element, such as a type of wheel used, as wheel diameter, a wheel width, a track width of the wheels, etc. Using the parameters input by the user, the controller 220 may estimate a steering angle corresponding to the desired stop position. The user may then rotate the wheels toward the desired stop position, and the controller 220 may automatically control the steering stop lock 240 to lock the knuckle stop 410 when the wheels reach the desired stop position (e.g., as determined using feedback from the steering angle sensor 230).

In other embodiments, the stop assembly 500 may be operated without the controller 220. By way of example, a user interface (e.g., the user interface 250) may be a mechanical input device (e.g., a button) coupled to the body 502. The user may provide a user input to the mechanical input device (e.g., pressing a button, releasing the button, etc.) to mechanically control the components of the stop assembly 500. By way of example, a first user input (e.g., pressing a button) may cause the lock pin 520 to move to the unlocked position, and a second user input (e.g., releasing the button) may cause the lock pin 520 to return to the locked position.

Locking Steering Stop—Configuration 1

Referring to FIGS. 8-16, a locking steering stop is shown as stop assembly 600. The stop assembly 600 is an exemplary configuration of the stop assembly 500. Accordingly, the stop assembly 500 may be substantially similar to the stop assembly 500, except as otherwise specified herein.

Figure 14:
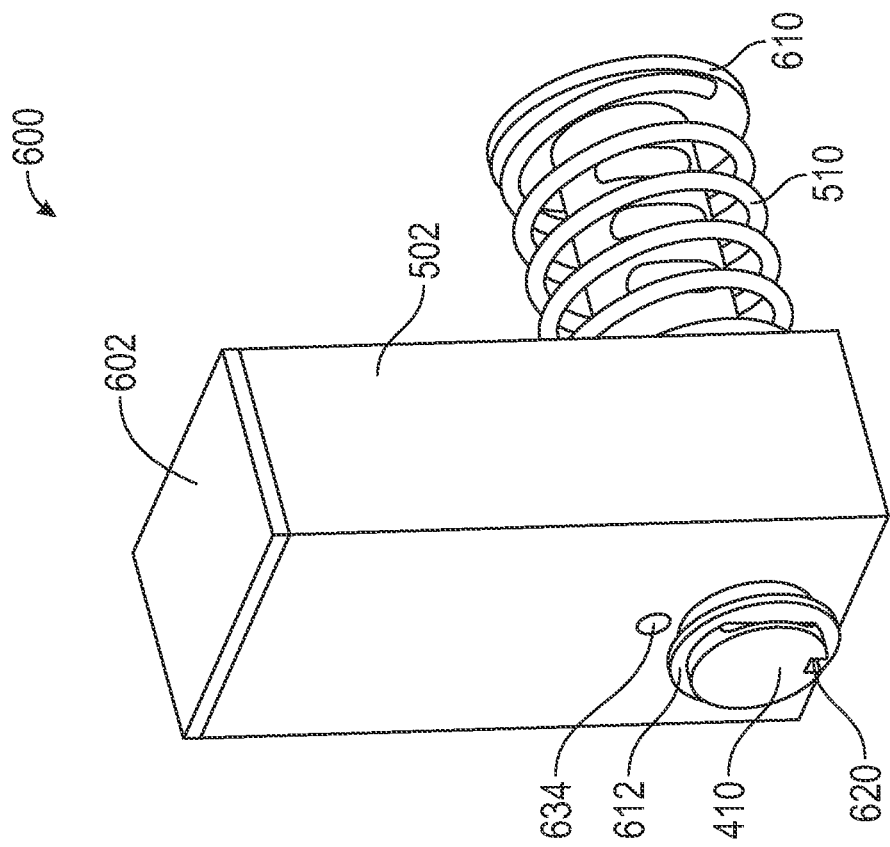
FIGS. 13 and 14 are perspective views of the stop assembly of FIG. 8.
Figure 13:
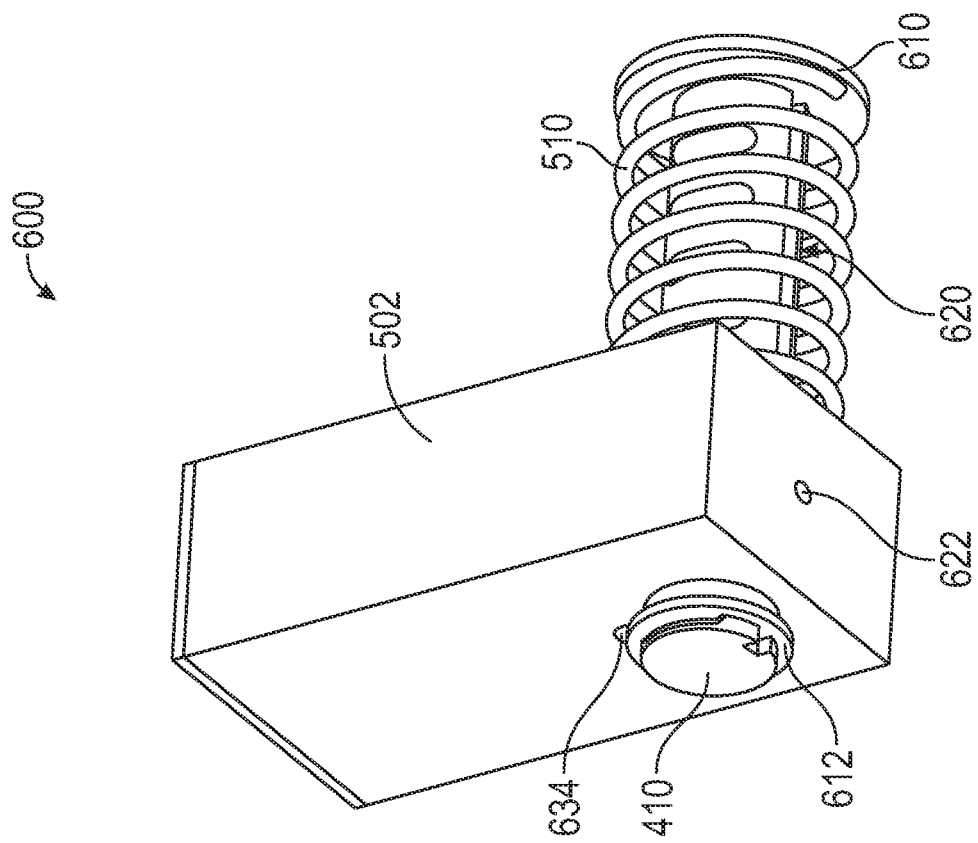
Figure 16:
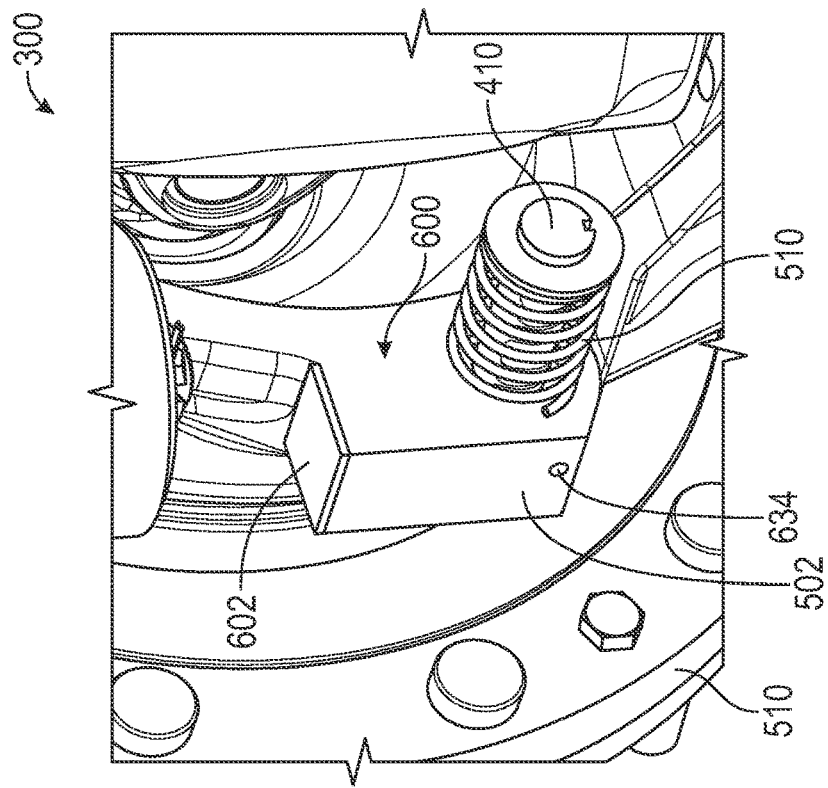
FIGS. 15 and 16 are perspective views of the axle assembly of FIG. 4 including the stop assembly of FIG. 8.
Figure 15:
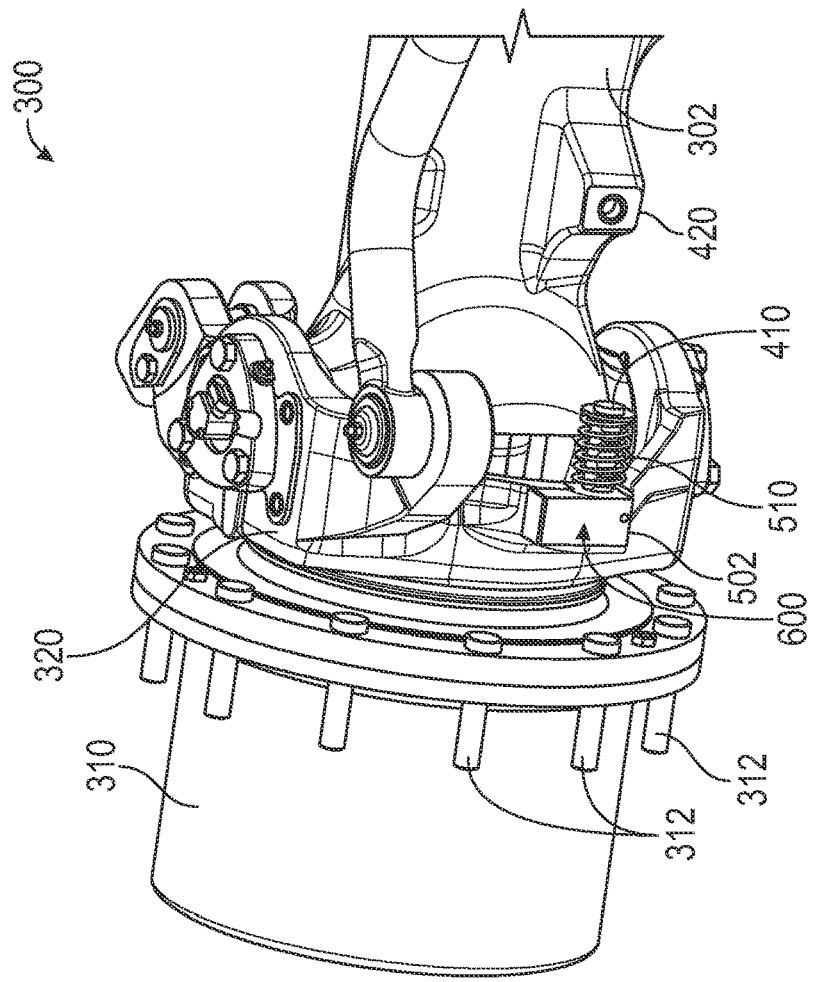

Although FIGS. 8-14 show the base 502 as a separate component, it should be understood that the base 502 may be formed separately from the knuckle 320 or integrally formed with the knuckle 320 as a single continuous component as shown in FIGS. 15 and 16. The base 502 includes a removable cover portion or door, shown as cover 602, that is removably coupled to the rest of the base 502 (e.g., by fasteners). The cover 602 may facilitate access to the interior components of the stop assembly 600 for maintenance and/or assembly. The base 502 may be filled with a lubricant, such as grease, to facilitate movement of the components within.

The stop assembly 600 includes a washer or flange, shown as flange 610, that is coupled to the stop end 412. The flange 610 is annular and extends radially outward from the knuckle stop 410. The spring 510 is a compression spring that is positioned between the base 502 and the flange 610. Accordingly, the base 502 and the flange 610 cooperate to compress the spring 510 when the knuckle stop 410 is retracted. In other embodiments, the spring 510 presses against an end of the knuckle stop 410 that is positioned opposite the stop end 412. In such an embodiment, the flange 610 may be omitted.

The stop assembly 600 includes an extension limiter or stop, shown as limiter flange 612. The limiter flange 612 is coupled to an end of the knuckle stop 410 that is positioned opposite the stop end 412. The limiter flange 612 is annular and extends radially outward from the knuckle stop 410. The limiter flange 612 is positioned to engage a back side of the base 502 to limit extension of the knuckle stop 410.

The stop assembly 500 includes a pair of lock pins 520: a lock pin 520A and a lock pin 520B. Each of the lock pins 520 is provided with a corresponding spring 546 that presses against the cover 602. The lock pin 520A and the lock pin 520B are laterally offset from one another (e.g., positioned on opposite sides of the axis 506) such that the lock pin 520A and the lock pin 520B engage opposite sides of the knuckle stop 410.

Figure 10:
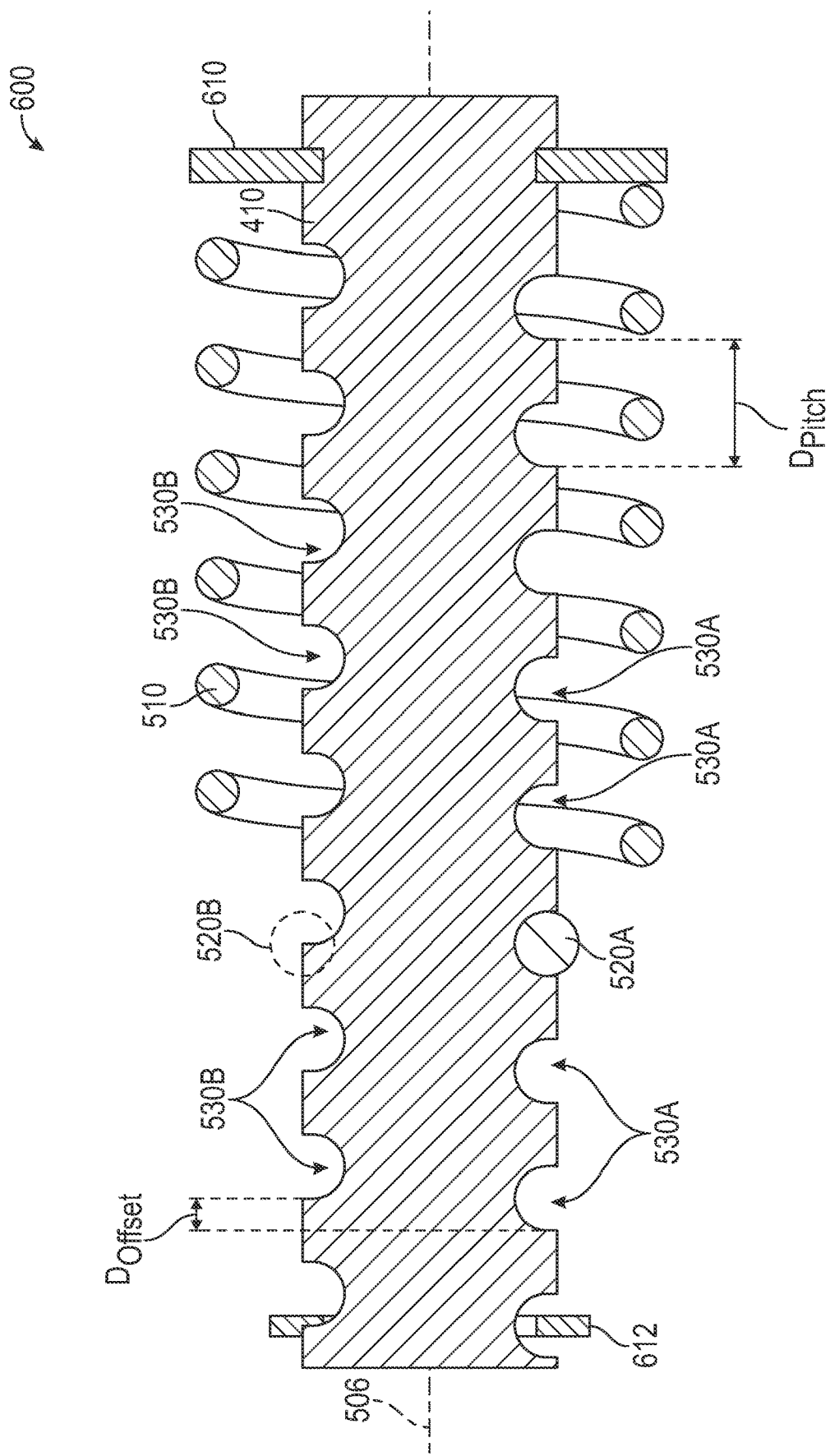
FIG. 10 is a top section view of the stop assembly of FIG. 8.

As shown in FIG. 10, the knuckle stop 410 defines a first series of detents 530, shown as detents 530A, spread along a first side of the knuckle stop 410 that is associated with (e.g., contacted by, aligned with, etc.) the lock pin 520A, and a second series of detents 530, shown as detents 530B, spread along a second side of the knuckle stop 410 that is associated with the lock pin 520B. The detents 530A are positioned to receive the lock pins 520A, and the detents 530B are positioned to receive the lock pins 520B. Each of the detents 530A and the detents 530B is a groove or notch that extends vertically through the knuckle stop 410. The detents 530A open toward a first lateral direction, and the detents 530B open toward a second lateral direction that is opposite the first lateral direction. Although the detents 530A and the detents 530B are shown as having a semicircular cross section, the detents 530A and the detents 530B may alternatively have triangular, square, trapezoidal, or other cross sections. The detents 530 and the lock pins 520 may have corresponding tapered shapes (e.g., triangular, semicircular, etc.) to facilitate alignment of the lock pins 520 with the corresponding detents 530.

The detents 530A are each longitudinally offset from one another by a pitch distance $D_{pitch}$. The pitch distance $D_{pitch}$ may be remain constant along the length of the knuckle stop 410. The pitch distance $D_{pitch}$ may be measured as a center-to-center distance or a distance between two common features of adjacent detents 530A (e.g., a leading edge of a first detent 530A and a leading edge of and adjacent detent 530A). Similarly, the detents 530B are each longitudinally offset from one another by the pitch distance $D_{pitch}$. The pitch distances $D_{pitch}$ of the detents 530A and the detents 530B may be substantially the same. The pitch distance $D_{pitch}$ may be measured as a center-to-center distance or a distance between two common features of adjacent detents 530B. The detents 530A and the detents 530B are offset from one another by a phase shift, shown as offset distance $D_{offset}$. The offset distance $D_{offset}$ may be less than the distance $D_{pitch}$.

FIG. 10 is a section view along a horizontal plane (e.g., a laterally and longitudinally extending plane) that illustrates the positions of the lock pins 520A and 520B relative to the knuckle stop 410 for an exemplary longitudinal position of the knuckle stop 410. In the configuration, the position of the lock pin 520B is shown as a dashed circle, as the lock pin 520B is located above the plane of the section view. As shown, the lock pins 520A and 520B are at approximately the same longitudinal position and the detents 530A are longitudinally offset from the detents 530B by the offset distance $D_{offset}$. As shown, the lock pin 520A aligns with one of the detents 530A and is pressed into the detent 530A by the spring 546. The lock pin 520B does not align with any of the detents 530B and accordingly rides along a top surface of the knuckle stop 410.

If the lock pins 520A and 520B are lifted (e.g., by the plate 542) to the unlocked position, the longitudinal position of the knuckle stop 410 may be adjusted until the lock pin 520B aligns with one of the detents 530B and is pressed into the detent 530B by the spring 546.

In this configuration, the lock pin 520A does not align with any of the detents 530A and accordingly rides along a top surface of the knuckle stop 410. Accordingly, by offsetting the detents 530A from the detents 530B, the lock pins 520A and the lock pins 520B are able to lock the knuckle stop 410 in twice as many positions as if the lock pins 520A and the lock pins 520B were both received within detents 530 simultaneously. This increases the adjustment resolution of the stop assembly 400, providing the user a finer degree of adjustment than a system that uses only one lock pin 520. In some embodiments, the possible adjustment positions are spaced from one another apart at half of the pitch distance $D_{pitch}$.

Referring to FIGS. 11 and 12, in order for the lock pins 520A and 520B to align with and enter the detents 530A and 530B, it may be desirable to limit (e.g., prevent) rotation of the knuckle stop 410. As the knuckle stop 410 is cylindrical, the stop assembly 600 may require a clocking feature to limit this rotation. As shown, a bottom side of the knuckle stop 410 defines a groove, notch, or keyway, shown as clocking groove 620, that extends along the length of the knuckle stop 410. The clocking groove 620 opens downward to receive a protrusion or key, shown as clocking pin 622, that is coupled to the base 502. The clocking pin 622 engages the walls of the clocking groove to limit rotation of the knuckle stop 410. As the clocking groove 620 extends longitudinally, the clocking pin 622 may not affect longitudinal movement of the knuckle stop 410. In other embodiments, the cross-sectional shape of the knuckle stop 410 is selected such that rotation of the knuckle stop 410 is limited (e.g., prevented) without the use of the clocking pin 622. By way of example, the knuckle stop 410 may have a triangular, square, hexagonal, octagonal, or other cross-sectional shape.

Referring to FIGS. 9, 12, and 14, the lock pin actuator 540 is a fluidic (e.g., hydraulic, pneumatic, etc.) actuator or single-acting cylinder (e.g., a hydraulic linear actuator). The cylinder includes a movable portion, shown as rod 630, that is coupled to the plate 542. The base 502 acts as a body of the cylinder, defining a vertical passage, shown as rod passage 632, that receives the rod 630. The rod 630 is slidably coupled to the base 502 and movable along the length of the rod passage 632. The base further defines a conduit or passage, shown as input port 634, that is fluidly coupled to an end of the rod 630 opposite the springs 546 and that is accessible from the exterior of the base 502.

In operation, pressurized fluid (e.g., gas or hydraulic oil) is supplied to the input port 634 to activate the lock pin actuator 540. The input port 634 supplies the fluid to the end of the rod 630, and the pressure forces the rod 630 upward, compressing the springs 546. To deactivate the lock pin actuator 540, the pressurized fluid may be released (e.g., to a low-pressure sink), and the biasing force of the springs 546 forces the rod 630 back downward. To control this operation, the controller 220 may operate one or more valves (e.g., directional control valves, solenoid valves, etc.) to supply pressurized fluid from another system onboard the vehicle 10 to the input port 634 and/or to relieve pressurized fluid from the input port 634 to a tank or reservoir.

Locking Steering Stop—Configuration 2

Figure 17:
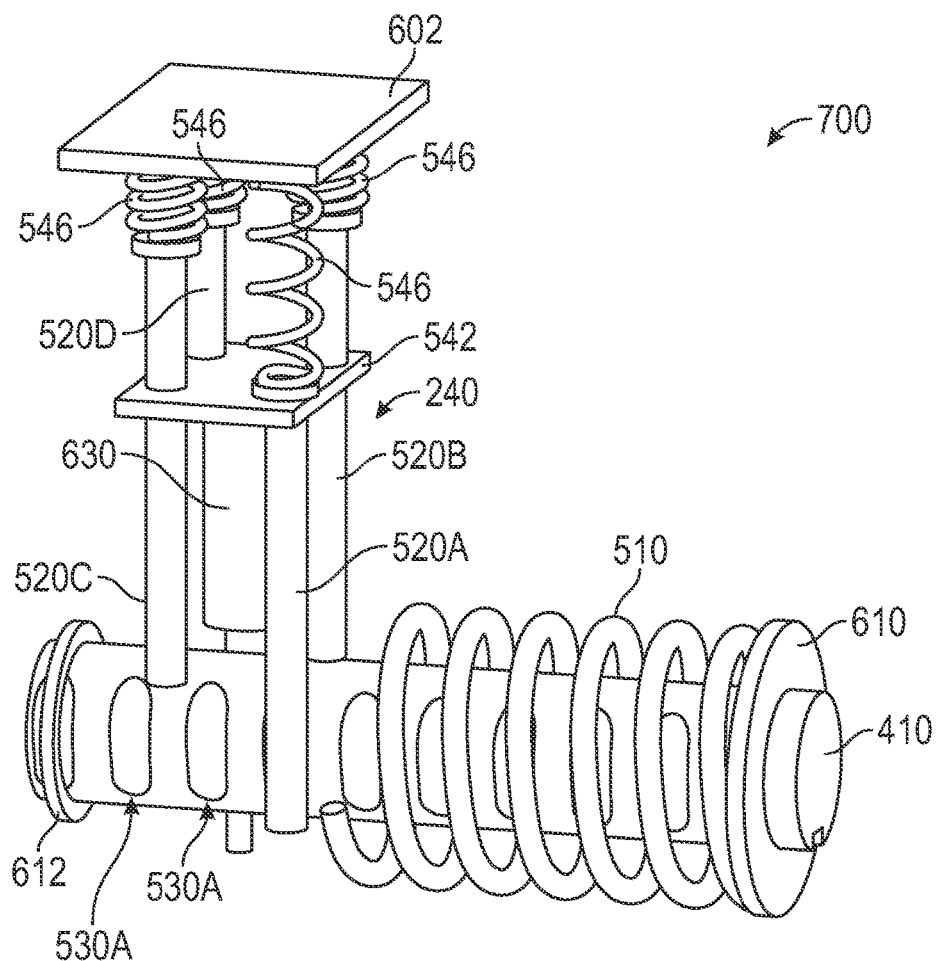
FIG. 17 is a perspective view of a stop assembly of the axle assembly of FIG. 3, according to another exemplary embodiment.
Figure 18:
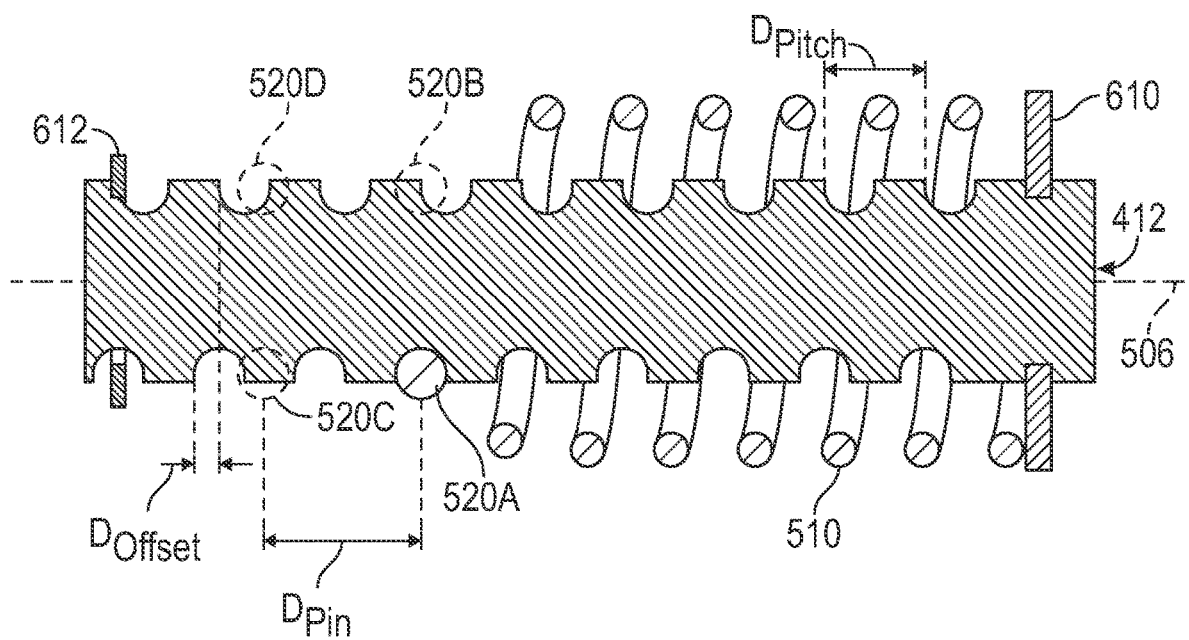
FIG. 18 is a top section view of the stop assembly of FIG. 17.

Referring to FIGS. 17 and 18, a locking steering stop is shown as stop assembly 700. The stop assembly 700 is an exemplary configuration of the stop assembly 500 and an alternative to the configuration of the stop assembly 600. Accordingly, the stop assembly 700 may be substantially similar to the stop assembly 600, except as otherwise specified herein.

In addition to the lock pins 520A and 520B, the stop assembly 700 further includes a lock pin 520C and a lock pin 520D. Each of the lock pins 520C and 520D is provided with a corresponding spring 546 that presses against the cover 602. The lock pin 520C and the lock pin 520D are laterally offset from one another (e.g., at the same lateral positions as the lock pin 520A and the lock pin 520B, respectively) such that the lock pin 520C and the lock pin 520D engage opposite sides of the knuckle stop 410. Accordingly, the lock pin 520C is positioned to engage the detents 530A, and the lock pin 520D is positioned to engage the detents 530B.

FIG. 18 is a section view along a horizontal plane (e.g., a laterally and longitudinally extending plane) that illustrates the positions of the lock pins 520A, 520B, 520C, and 520D relative to the knuckle stop 410 for an exemplary longitudinal position of the knuckle stop 410. In the configuration, the positions of the lock pins 520B, 520C, and 520D are shown as dashed circles, as the lock pins 520B, 520C, and 520D are located above the plane of the section view. As shown, the lock pins 520A and 520B are located at a first longitudinal position. The lock pins 520C and 520D are located at a second longitudinal position that is longitudinally offset from the first longitudinal positon by an offset distance $D_{pins}$. The positions of the detents 530A and 530B remain the same from the stop assembly 600.

As shown, the lock pin 520A aligns with one of the detents 530A and is pressed into the detent 530A by the spring 546. The lock pins 520B, 520C, and 520D do not align with any of the detents 530A or the detents 530B, and accordingly ride along a top surface of the knuckle stop 410. If the lock pins 520A, 520B, 520C, and 520D are lifted (e.g., by the plate 542) to the unlocked position, the longitudinal position of the knuckle stop 410 may be adjusted until (a) the lock pin 520B aligns with one of the detents 530B and is pressed into the detent 530B by the spring 546, (b) the lock pin 520C aligns with one of the detents 530A and is pressed into the detent 530A by the spring 546, or (c) the lock pin 520D aligns with one of the detents 530B and is pressed into the detent 530B by the spring 546.

The pitch distance $D_{pitch}$, the offset distance $D_{offset}$, and/or the offset distance $D_{pin}$ may be selected such that only one of the lock pins 520A, 520B, 520C, and 520D is aligned with and can engage one of the detents at any given time. Accordingly, by offsetting the detents and the lock pins in this way, the lock pins 520A, 520B, 520C, and 520D are able to lock the knuckle stop 410 in four times as many positions as if the lock pins 520A, 520B, 520C, and 520D were all received within detents 530 simultaneously. This increases the adjustment resolution of the stop assembly 400, providing the user a finer degree of adjustment than a system that uses only one lock pin 520. In some embodiments, the possible adjustment positions are spaced apart from one another at one quarter of the pitch distance $D_{pitch}$. In other embodiments, the stop assembly 700 includes more or fewer lock pins (e.g., three, five, six, ten, etc.).

Locking Steering Stop—Configuration 3

Figure 20:
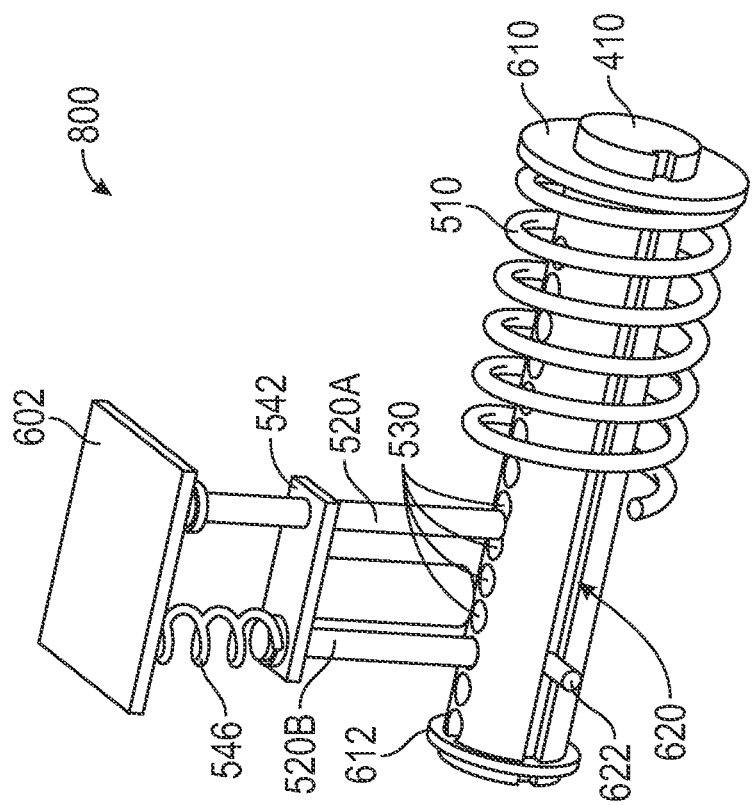
FIGS. 19 and 20 are perspective views of a stop assembly of the axle assembly of FIG. 3, according to another exemplary embodiment.
Figure 19:
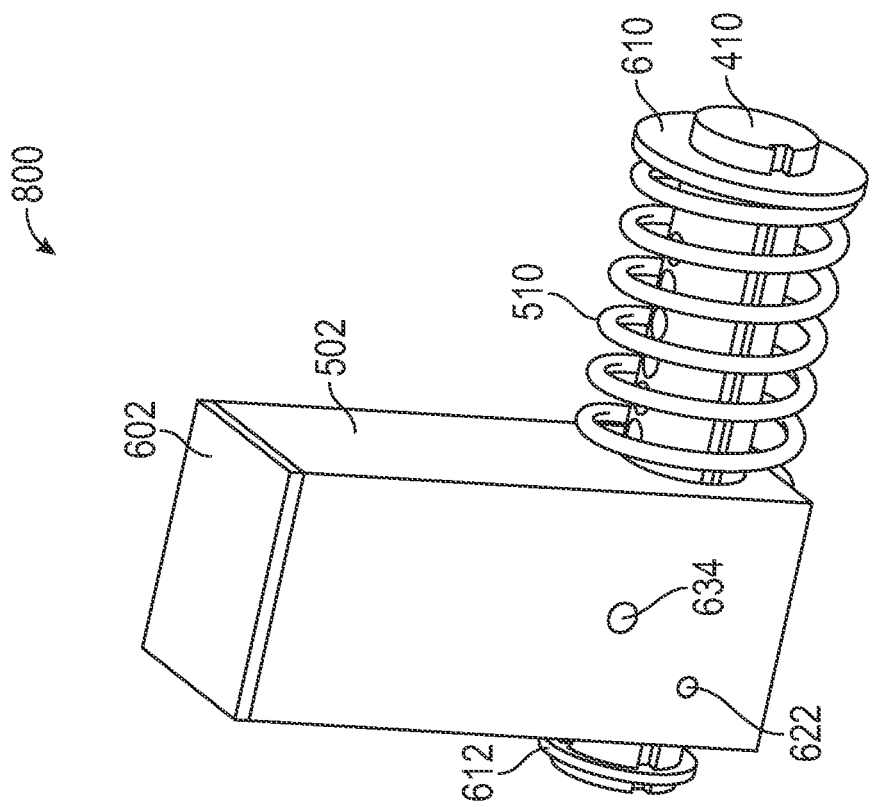

Referring to FIGS. 19 and 20, a locking steering stop is shown as stop assembly 800. The stop assembly 800 is an exemplary configuration of the stop assembly 500 and an alternative to the configuration of the stop assembly 600. Accordingly, the stop assembly 800 may be substantially similar to the stop assembly 600, except as otherwise specified herein.

In the stop assembly 800, the detents 530 are formed as a single line of passages or recesses positioned along a lateral centerline of the knuckle stop 410. In other words, the knuckle stop 410 and the detents 530 are centered about a plane that is perpendicular to a lateral axis. The lock pins 520A and 520B and the rod 630 of the lock pin actuator 540 are also centered along this plane.

The lock pins 520A and 520B are both positioned to align with the same set of the detents 530. The pitch distance $D_{pitch}$ and the offset distance $D_{pins}$ between the lock pins 520A and 520B are selected such that only one of the lock pins 520A and 520B is aligned with and can engage one of the detents 530 at any given time. Accordingly, by offsetting the detents and the lock pins in this way, the lock pins 520A and 520B are able to lock the knuckle stop 410 in two times as many positions as if the lock pins 520A and 520B were both received within the detents 530 simultaneously. In some embodiments, the possible adjustment positions are spaced apart from one another at half of the pitch distance $D_{pitch}$. This cross-dilled arrangement with detents 530 centered on the knuckle stop 410 may provide increased strength but less adjustability relative to a system with detents 530 along the sides of the knuckle stop 410 (e.g., the stop assembly 600).

In some embodiments, the rod 630 is positioned directly between the lock pins 520A and 520B. Because of this, the forces imparted on the plate 542 by the rod 630 and the lock pins 520A and 520B are symmetrical. This reduces the cantilever effect on the plate 542 that occurs when the rod 630 is offset from the lock pins 520 that would otherwise introduce additional frictional forces into the system.

As shown, the clocking groove 620 and the clocking pin 622 are moved from the below the knuckle stop 410 to along the side of the knuckle stop 410. This may reduce the overall size of the stop assembly 800. In other embodiments, the clocking groove 620 and the clocking pin 622 are located at a different radial position relative to the knuckle stop 410.

Locking Steering Stop—Configuration 4

Figure 22:
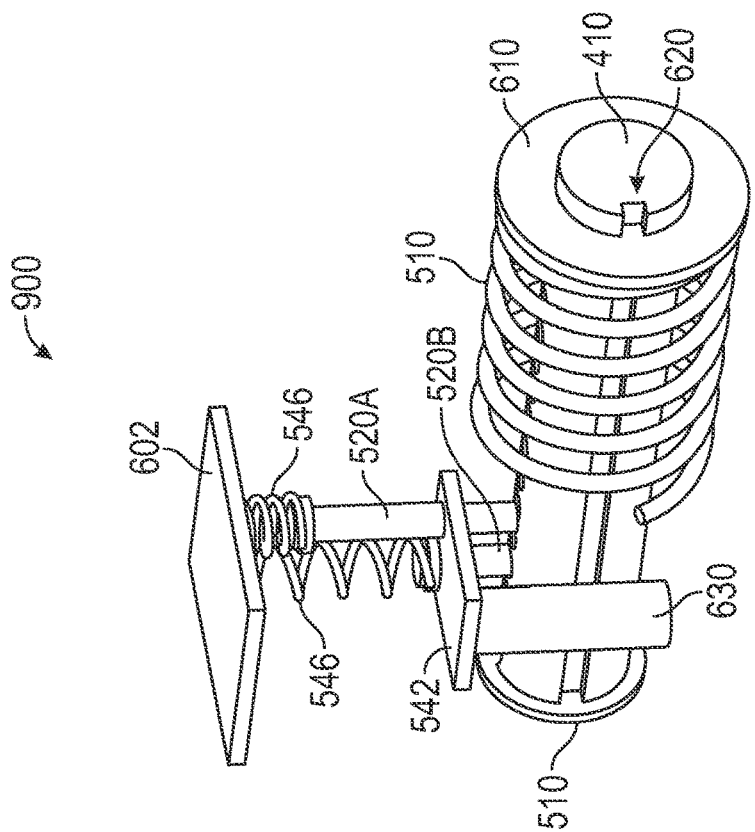
FIGS. 21 and 22 are perspective views of a stop assembly of the axle assembly of FIG. 3, according to another exemplary embodiment.
Figure 21:
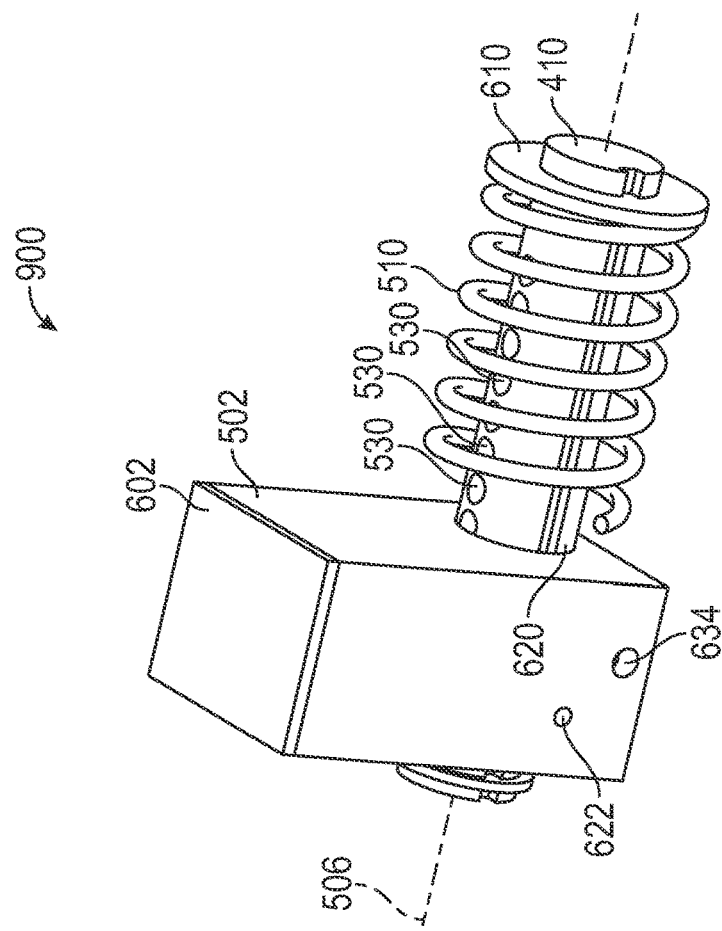

Referring to FIGS. 21 and 22, a locking steering stop is shown as stop assembly 900. The stop assembly 800 is an exemplary configuration of the stop assembly 500 and an alternative to the configuration of the stop assembly 800. Accordingly, the stop assembly 900 may be substantially similar to the stop assembly 800, except as otherwise specified herein.

In the stop assembly 900, the rod 630 is offset from the plane containing the lock pins 520A and 520B. This positioning permits the lock pins 520A and 520B to be moved closer toward one another, reducing the longitudinal thickness of the stop assembly 800. However, in this arrangement, the forces imparted on the plate 542 by the rod 630 and the lock pins 520A and 520B are not symmetrical, introducing a cantilever effect on the plate 542. This moment loading may introduce frictional forces into the system.

Locking Steering Stop—Configuration 5

Figure 24:
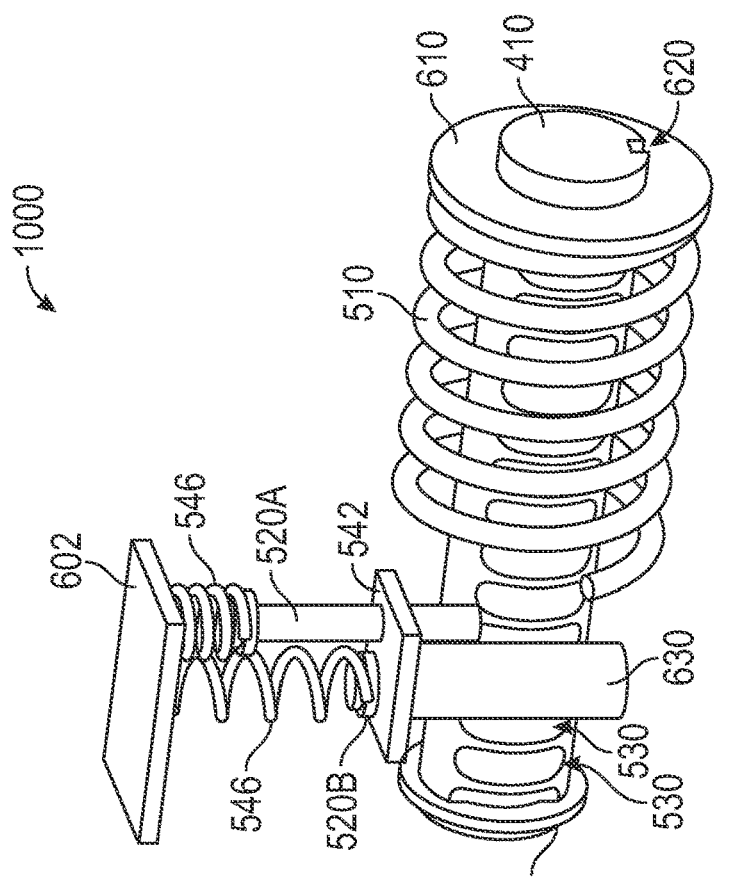
FIGS. 23 and 24 are perspective views of a stop assembly of the axle assembly of FIG. 3, according to another exemplary embodiment.
Figure 23:
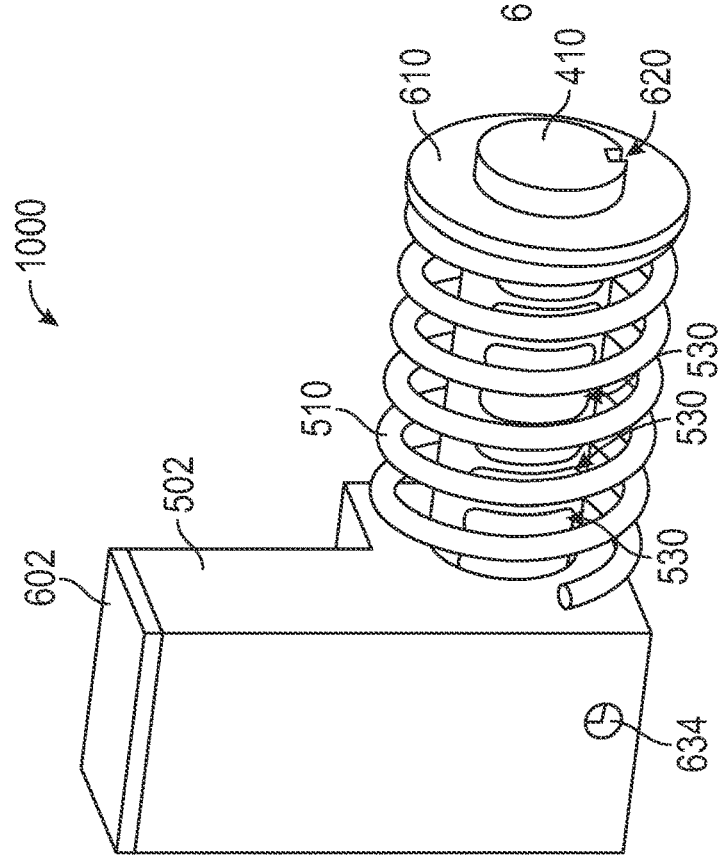

Referring to FIGS. 23 and 24, a locking steering stop is shown as stop assembly 1000. The stop assembly 1000 is an exemplary configuration of the stop assembly 500 and an alternative to the configuration of the stop assembly 900.

Accordingly, the stop assembly 1000 may be substantially similar to the stop assembly 900, except as otherwise specified herein.

In the stop assembly 1000, the detents 530 are configured as grooves along one side of the knuckle stop 410. Accordingly, the lock pins 520A and 520B are positioned within a plane that is offset from the center plane of the knuckle stop 410.

Actuated Steering Stops

Referring to FIGS. 25-28, the axle is shown 300 with various actuated steering stop assemblies, each including a steering stop actuator 242 that is configured to adjust a position of a steering stop. The steering stop actuator 242 may be controlled by the controller 220 to translate and/or rotate the steering stops, varying the corresponding stop position. This adjustment may be manually controlled by the user through the user interface 250 or automatically controlled by the controller 220.

Actuated Knuckle Steering Stop

Figure 25:
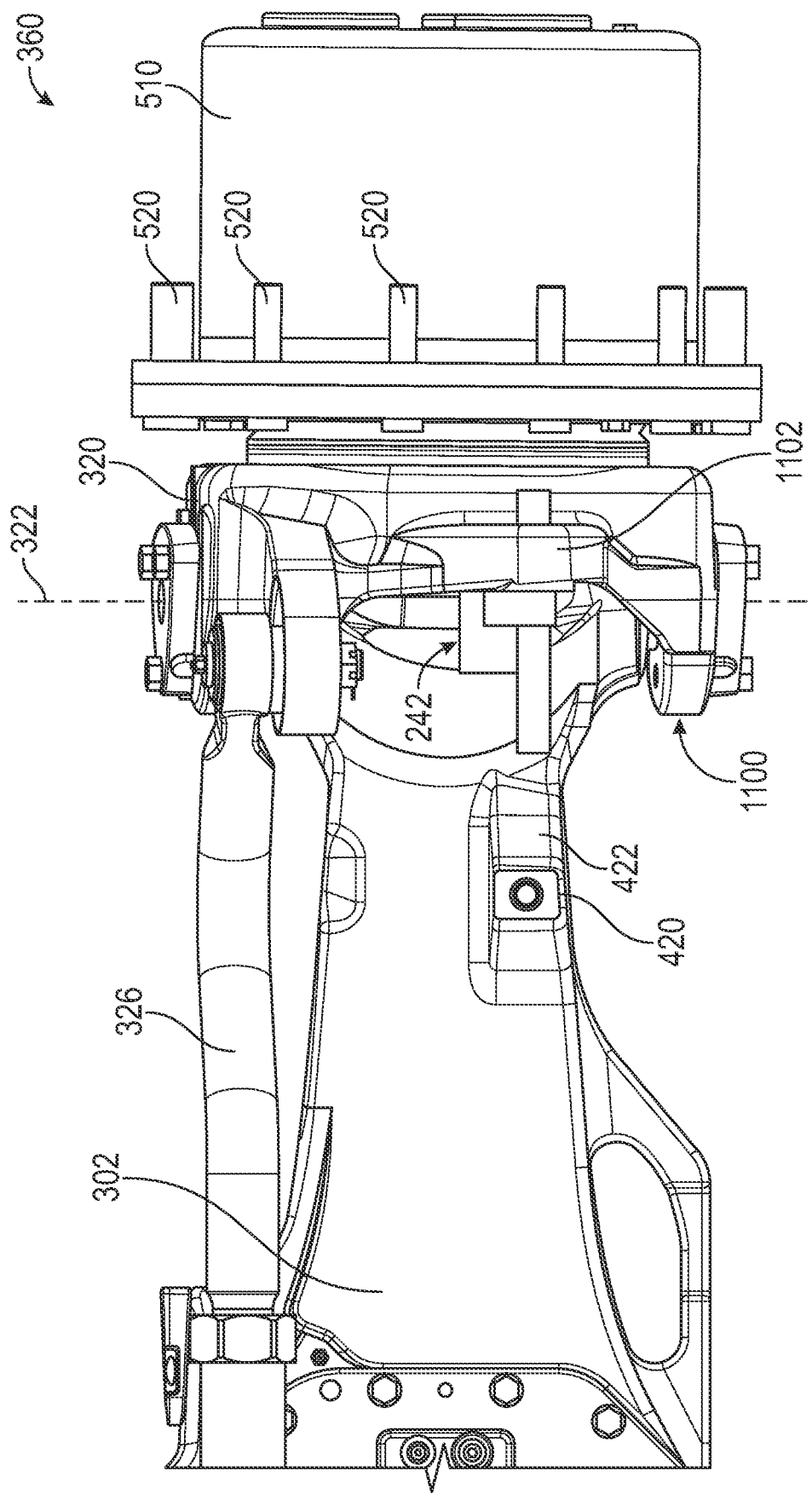
FIG. 25 is a front view of the axle assembly of FIG. 3 including a stop assembly and a steering stop actuator, according to an exemplary embodiment.
Figure 26:
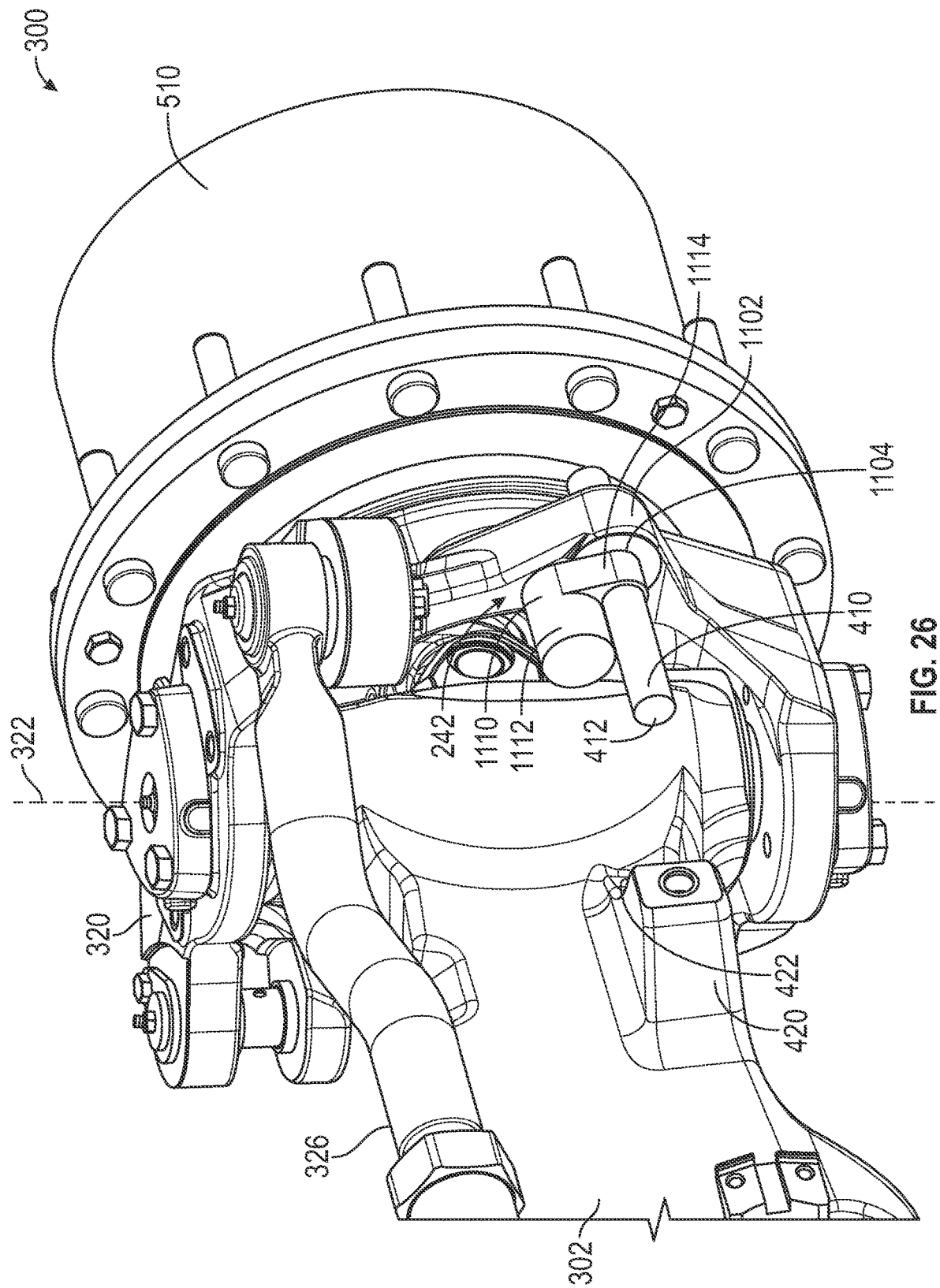
FIG. 26 is a perspective view of the axle assembly of FIG. 3 including the stop assembly and the steering stop actuator of FIG. 25.

Referring to FIGS. 25 and 26, the axle assembly 300 is shown including an actuated knuckle steering stop assembly, shown as stop assembly 1100, according to an exemplary embodiment. The stop assembly 1100 includes a steering stop actuator 242 that is configured to adjust the position of the knuckle stop 410 relative to the knuckle 320. In some embodiments, the stop assembly 1100 is infinitely adjustable. In other words, the stop assembly 1100 is configured to continuously adjust the knuckle stop 410 through a predetermined range of positions (e.g., containing an infinite number of discrete positions) and hold the knuckle stop 410 at any position within the range of positions. The stop assembly 1100 may make up a portion of the stop assembly 400.

As shown, the knuckle stop 410 is configured as a shaft that passes through a portion or section, shown as base 1102, of the knuckle 320. Specifically, the knuckle stop 410 passes through an aperture or passage, shown as stop aperture 1104, that is defined by the base 1102. The knuckle stop 410 is repositionable along the length of the stop aperture 1104 to adjust the distance between the stop end 412 and the contact surface 422.

The stop assembly 1100 includes a steering stop actuator 242 that is configured to control movement of the knuckle stop 410 relative to the base 1102. The steering stop actuator 242 includes a driver or actuator (e.g., an adjustment actuator), shown as electric motor 1110. The electric motor 1110 is positioned within an enclosure, shown as housing 1112, that is coupled (e.g., fixedly coupled) to the base 1102. The electric motor 1110 is coupled to the knuckle stop 410 by a power transmission or gear train, shown as transmission 1114, that is also positioned at least partially within the housing 1112.

The transmission 1114 is configured to transfer mechanical energy (e.g., rotational mechanical energy) from the electric motor 1110 to the knuckle stop 410, causing movement of the knuckle stop 410 relative to the base 1102. The transmission and the electric motor 1110 may cause the knuckle stop 410 to extend (e.g., move toward the beam stop 420) or retract (e.g., move away from the beam stop) as desired. The direction of movement of the knuckle stop 410 may be changed, for example, by switching the direction of rotation of the electric motor 1110. The electric motor 1110, the transmission 1114, and the knuckle stop 410 thus act as an electric linear actuator. By way of example, the exterior of the knuckle stop 410 may be threaded (e.g., as a ball screw or lead screw), and the transmission 1114 may include a nut or turning portion that, when rotated by the electric motor 1110, causes corresponding linear motion of the knuckle stop 410 relative to the base 1102. Changing the direction of rotation of the electric motor 1110 may cause the nut to rotate in a different direction, thereby changing the direction of movement of the knuckle stop 410. By way of another example, the knuckle stop 410 may define a rack gear, and the transmission 1114 may include a corresponding pinion gear that engages the rack gear. The electric motor 1110 may rotate the pinion gear in a first direction to cause the knuckle stop 410 to extend and may rotate the pinion gear in a second direction to cause the knuckle stop 410 to retract.

In some embodiments, the transmission 1114 includes a clutch or backdrive prevention element that is configured to limit (e.g., prevent) movement of the knuckle stop 410 that would otherwise be caused by application of a force onto the knuckle stop 410 (e.g., by contact with the beam stop 420). By way of example, the transmission 1114 may include a gear train containing a worm gear that cannot be backdriven due to the pitch of the gear teeth on the worm gear. By way of another example, the transmission 1114 may include ratchet or another type of clutch that permits transfer of force in a first direction and prevent transfer of force in an opposing second direction.

In other embodiments, the knuckle stop 410 is otherwise actuated. By way of example, the knuckle stop 410 may be part of a hydraulic linear actuator (e.g., a hydraulic cylinder). In such an embodiment, the knuckle stop 410 may act as the rod of the hydraulic linear actuator and be received within a cylinder body (e.g., built into the knuckle 320). Movement of the knuckle stop 410 may be controlled by providing pressurized hydraulic fluid to a cap side or a rod side of the cylinder.

Actuated Beam Steering Stop

Figure 27:
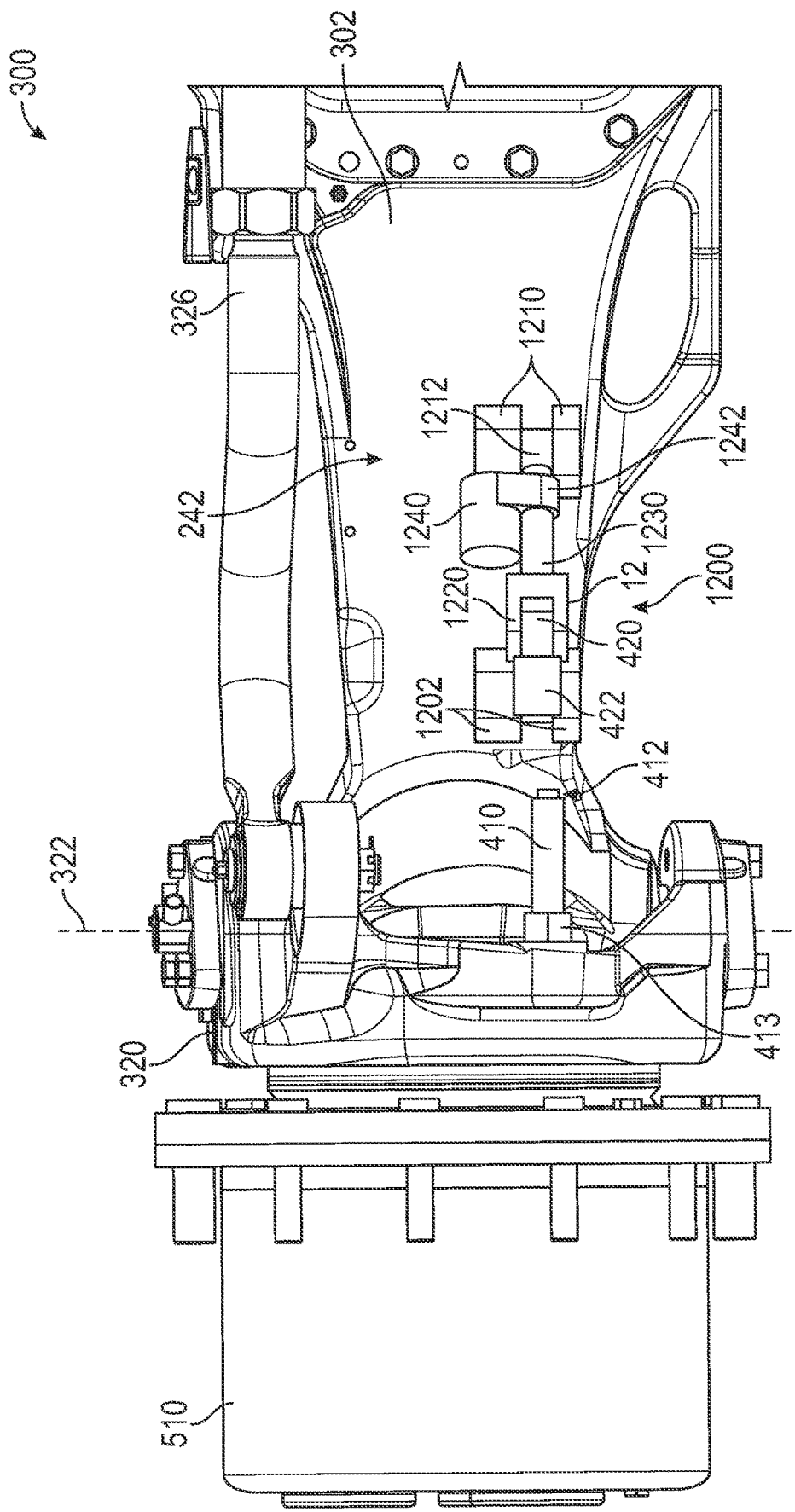
FIG. 27 is a front view of the axle assembly of FIG. 3 including a stop assembly and a steering stop actuator, according to another exemplary embodiment.
Figure 28:
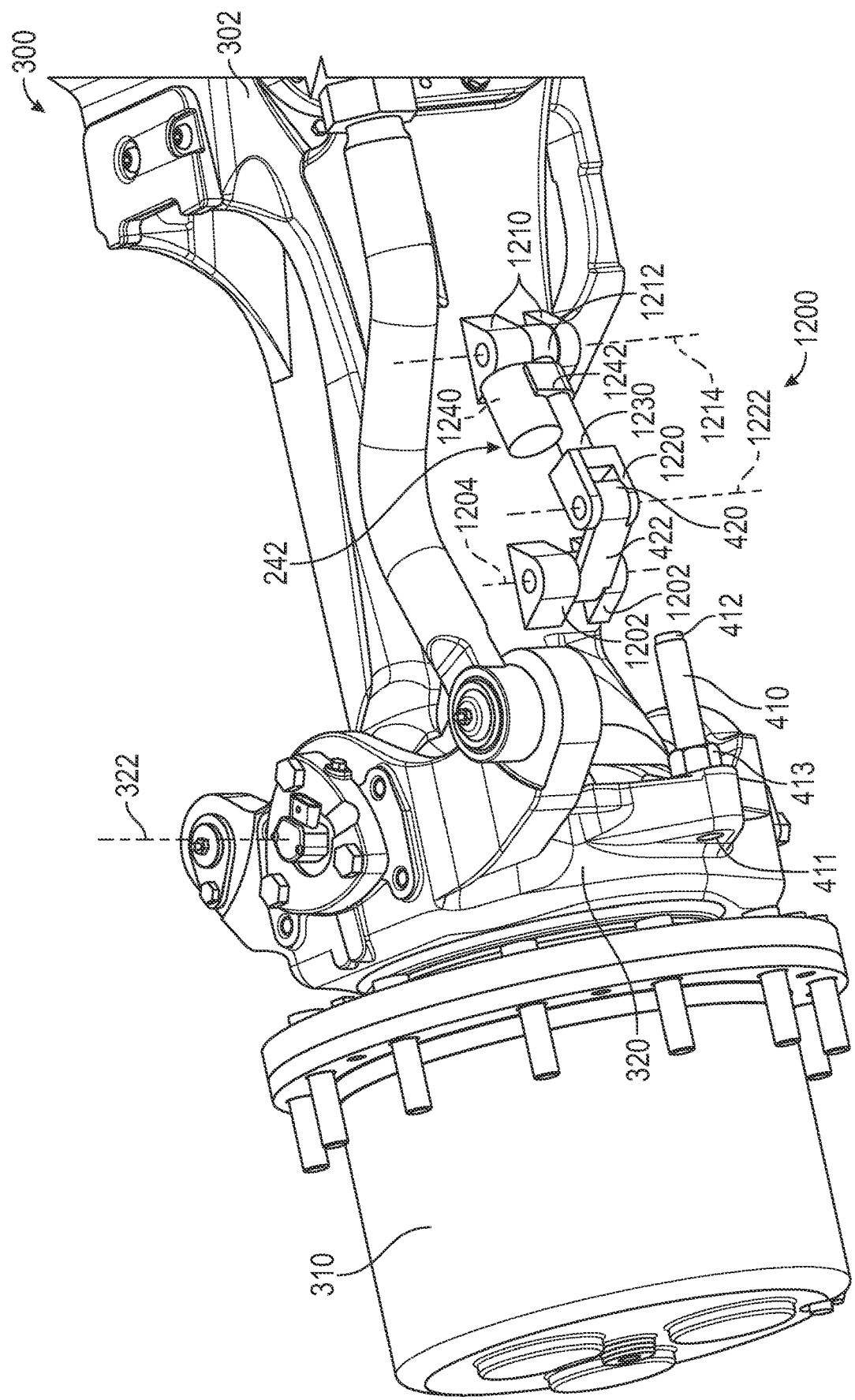
FIG. 28 is a perspective view of the axle assembly of FIG. 3 including the stop assembly and the steering stop actuator of FIG. 27.

Referring to FIGS. 27 and 28, the axle assembly 300 is shown including an actuated beam steering stop assembly, shown as stop assembly 1200, according to an exemplary embodiment. The stop assembly 1200 includes a steering stop actuator 242 that is configured to adjust the rotational position (e.g., orientation) of the beam stop 420 relative to the beam 302. In some embodiments, the stop assembly 1200 is infinitely adjustable. In other words, the stop assembly 1200 is configured to continuously adjust the beam stop 420 through a predetermined range of positions (e.g., containing an infinite number of discrete positions) and hold the beam stop 420 at any position within the range of positions. The stop assembly 1200 may make up a portion of the stop assembly 400.

In the configuration of FIG. 28, the knuckle stop 410 is threaded and engages a corresponding threaded aperture 411 defined by the knuckle 320. A fastener, shown as nut 413, is in threaded engagement with the threaded portion of the knuckle stop 410. The position of the knuckle stop 410 may be adjusted by rotating the knuckle stop 410. When rotated, the threaded engagement causes the knuckle stop 410 to translate along the length of the threaded aperture 411. To fix the knuckle stop 410 in place, the nut 413 may be tightened against the knuckle 320, such that friction holds the nut 413 and the knuckle stop 410 in place. While the knuckle stop 410 is adjustable in the configuration of FIG. 28, the user must manually access the knuckle stop 410, and adjustment of the knuckle stop 410 may require the use of tools. The stop assembly 1200 advantageously adjusts the beam stop 420 through the user of the steering stop actuator 242, eliminating the requirement for the user to be present beneath the body 20 and the requirement for the use of tools. In other embodiments, the knuckle stop 410 is otherwise adjustable (e.g., through the stop assembly 600 or the stop assembly 1100, etc.), or the knuckle stop 410 is fixed in place.

As shown, the beam stop 420 is configured as a stop plate. The stop assembly 1200 includes a stationary hinge portion, shown as bosses 1202. The bosses 1202 each define an aperture that is configured to receive a pin to pivotally couple the beam stop 420 to the beam 302, such that the beam stop 420 is rotatable about a substantially vertical axis, shown as axis of rotation 1204. The axis of rotation 1204 is positioned at a proximal end of the beam stop 420. By rotating the beam stop 420 about the axis of rotation 1204, the distance between the contact surface 422 and the stop end 412 may be varied.

The stop assembly 1200 further includes a second stationary hinge portion, shown as bosses 1210. The bosses 1210 each define an aperture that is configured to receive a pin to pivotally couple a rotating portion, shown as pivot member 1212, to the beam 302, such that the pivot member 1212 is rotatable about a substantially vertical axis, shown as axis of rotation 1214.

A pivotal connection member, shown as clevis 1220, is pivotally coupled to an end of the beam stop 420 that is opposite the axis of rotation 1204. The clevis 1220 is rotatable relative to the beam stop 420 about a substantially vertical axis, shown as axis of rotation 1222. The axis of rotation 1222 is positioned at a distal end of the beam stop 420. The pivot member 1212 is coupled to the clevis 1220 by a variable length section or assembly, shown as shaft 1230. The shaft 1230 has a variable working length (e.g., the distance between where the shaft 1230 is connected to the clevis 1220 and where the shaft 1230 is connected to the pivot member 1212), such that the shaft 1230 controls the distance between the pivot member 1212 and the clevis 1220. Accordingly, the beam 302, the beam stop 420, the pivot member 1212, the clevis 1220, and the shaft 1230 cooperate to form a slider/crank arrangement. By increasing the working length of the shaft 1230, the distance between the axis of rotation 1214 and the axis of rotation 1222 increases, forcing the beam stop 420 to rotate in a first direction. By decreasing the working length of the shaft 1230, the distance between the axis of rotation 1214 and the axis of rotation 1222 decreases, forcing the beam stop 420 to rotate in a second direction opposite the first direction.

The steering stop actuators 242 includes a driver, motor, or actuator (e.g., an adjustment actuator), shown as electric motor 1240, and a power transmission or gear train, shown as transmission 1242. The transmission 1242 couples the electric motor 1240 to the shaft 1230 such that rotation of the electric motor 1240 controls the working length of the shaft 1230. The electric motor 1240 may cause the working length of the shaft 1230 to increase or decrease, as desired. Accordingly, the electric motor 1240, the transmission 1242, and the shaft 1230 act as an electric linear actuator. By way of example the shaft 1230 may be a threaded shaft that engages a corresponding threaded aperture defined by the pivot member 1212. The electric motor 1240 may cause rotation of the shaft 1230 such that the shaft is drawn into or expelled out of the pivot member 1212, varying the working length.

In other embodiments, the shaft 1230 is otherwise actuated. By way of example, the shaft 1230 may be configured as a hydraulic linear actuator (e.g., a hydraulic cylinder) including a rod coupled to the clevis 1220 and a cylinder body coupled to the pivot member 1212 (or vice versa). Extension or retraction of the shaft 1230 may be controlled by providing pressurized hydraulic fluid to a cap side or a rod side of the cylinder.

Actuated Steering Stops—Operation

In operation, the controller 220 may utilize the steering stop actuator 242 of the stop assembly 1100 to adjust the stop position associated with the stop assembly 1100. Similarly, the controller 220 may utilize the steering stop actuator 242 of the stop assembly 1200 to adjust the stop position associated with the stop assembly 1200. After installing a new set of wheels, the user may wish to adjust the right and left stop positions to prevent the wheels scrubbing against the body 20 while maximizing the turning radius of the vehicle 10. To accomplish this, the controller 220 may activate the electric motor 1110 or the electric motor 1240 to move the corresponding steering stop to a position corresponding to the desired stop position.

The desired stop position may be determined in a variety of different ways. In some embodiments, the user manually determines the desired stop position by eye and indicates the desired stop position through the user interface 250. In such an embodiment, the user selection of the desired stop position may inherently account for a variety of vehicle parameters (e.g., track width, wheel diameter, wheel thickness, etc.). The controller 220 may determine and record the steering angle corresponding to the desired stop position using the steering angle sensor 230.

In other embodiments, the wheel contact sensors 232 may be used to determine the desired stop position. By way of example, the user may turn the wheels until one of the wheels engages a wheel contact sensor 232, indicating that the wheel is near contact with the body 20 or in contact with the body 20. This indication may be considered an indication of a vehicle parameter, such as the position at which the wheel contacts the body. The controller may then determine the steering angle corresponding to the desired stop position using the steering angle sensor 230.

In other embodiments, the controller 220 may determine the desired stop position based on one or more vehicle parameters input by the user. By way of example, the user may input (e.g., through the user interface 250) one or more vehicle parameters related to a configuration of the tractive element, such as a type of wheel used, as wheel diameter, a wheel width, a track width of the wheels, etc. Using the parameters input by the user, the controller 220 may estimate a steering angle corresponding to the desired stop position.

In some embodiments, once the steering angle corresponding to the desired stop position is determined, the controller 220 may utilize a predetermined relationship between the steering angle and the position of the steering top to determine a desired position of the steering stop. The controller 220 may then utilize the electric motor to adjust the steering stop to that position. By way of example, the controller 220 may determine the position of the steering stop using a sensor. Alternatively, the controller 220 may instruct the user to adjust the wheels to the desired steering stop position (e.g., using feedback from the steering angle sensor 230 to determine when this has been accomplished). The controller 220 may then extend the steering stop until the knuckle stop 410 engages the beam stop 420. Contact between the steering stops may be identified by the controller based on an increase in the electrical current drawn by the electric motor.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:
1. An adjustable steering stop, comprising:
 a chassis stop configured to be coupled to a chassis member of a vehicle;
 a knuckle stop configured to be coupled to a steering knuckle, wherein the chassis stop and the knuckle stop together define a steering limit location where the knuckle stop contacts the chassis stop; and an adjustment actuator coupled to one of the chassis stop or the knuckle stop to move the chassis stop or the knuckle stop thereby changing the steering limit location, wherein the adjustment actuator is configured to continuously adjust the chassis stop or the knuckle stop through a range of positions and hold the chassis stop or the knuckle stop at any position within the range of positions.

2. The adjustable steering stop of claim 1, wherein the adjustment actuator is configured to be coupled to the chassis member and move the chassis stop relative to the knuckle stop.

3. An adjustable steering stop, comprising:
a chassis stop configured to be coupled to a chassis member of a vehicle, the chassis stop including a stop plate rotationally movable relative to the chassis member about an axis of rotation;
a knuckle stop configured to be coupled to a steering knuckle, wherein the chassis stop and the knuckle stop together define a steering limit location where the knuckle stop contacts the chassis stop; and
an adjustment actuator coupled to the chassis stop and configured to be coupled to the chassis member, wherein the adjustment actuator is configured to move the chassis stop relative to the knuckle stop thereby changing the steering limit location.

4. The adjustable steering stop of claim 3, wherein the adjustment actuator controls a degree of rotation of the stop plate.

5. The adjustable steering stop of claim 3, wherein the axis of rotation is positioned at a proximal end of the stop plate, and
wherein the adjustment actuator includes a linear actuator coupled to a distal end of the stop plate.

6. An adjustable steering stop, comprising:
a chassis stop configured to be coupled to a chassis member of a vehicle;
a knuckle stop configured to be coupled to a steering knuckle and including an end portion that is engagable with the chassis stop, wherein the chassis stop and the knuckle stop together define a steering limit location where the knuckle stop contacts the chassis stop; and
an adjustment actuator coupled to one of the chassis stop or the knuckle stop to move the chassis stop or the knuckle stop thereby changing the steering limit location.

7. The adjustable steering stop of claim 1, wherein the adjustment actuator is coupled to the steering knuckle and configured to move the knuckle stop relative to the chassis stop.

8. The adjustable steering stop of claim 7, wherein the knuckle stop includes a shaft that is extendable relative to the steering knuckle.

9. The adjustable steering stop of claim 8, wherein the adjustment actuator moves the shaft relative to the steering knuckle.

10. The adjustable steering stop of claim 9, wherein the knuckle stop includes a threaded portion, and wherein the adjustment actuator is configured to rotate a nut that is in threaded engagement with the threaded portion of the knuckle stop.

11. An adjustable steering stop, comprising:
a chassis stop configured to be coupled to a chassis member of a vehicle;
a knuckle stop configured to be coupled to a steering knuckle, wherein the chassis stop and the knuckle stop together define a steering limit location where the knuckle stop contacts the chassis stop;
an adjustment actuator coupled to one of the chassis stop or the knuckle stop to move the chassis stop or the knuckle stop thereby changing the steering limit location; and
a controller configured to control the adjustment actuator in response to a user input through a user interface.

12. The adjustable steering stop of claim 11, wherein the user interface is positioned within a cab of the vehicle such that the user input is provided by a user positioned within the cab.

13. The adjustable steering stop of claim 11, further comprising a wheel contact sensor configured to determine when a tractive element of the vehicle is at least one of (a) in contact with a body of the vehicle or (b) near the body of the vehicle, and wherein the controller is configured to control the adjustment actuator based on the user input and an indication from the wheel contact sensor.

14. The adjustable steering stop of claim 11, wherein the controller is configured to:
receive a vehicle parameter relating to a configuration of a tractive element; and
automatically adjust the steering limit location based on the vehicle parameter.

15. A vehicle, comprising:
a chassis; and
an axle assembly comprising:
a frame coupled to the chassis;
a chassis stop coupled to the frame;
a steering knuckle rotatably coupled to the frame and configured to support a tractive element;
a knuckle stop coupled to the steering knuckle and positioned to selectively engage the chassis stop to limit rotation of the steering knuckle beyond a steering stop position; and
an adjustment actuator coupled to one of the chassis stop or the knuckle stop and configured to move the chassis stop or the knuckle stop to adjust the steering stop position.

16. The vehicle of claim 15, further comprising:
a cab coupled to the chassis;
a user interface positioned in the cab and configured to receive a user input; and
a controller configured to control operation of the adjustment actuator to adjust the steering stop position based on the user input.

17. The vehicle of claim 15, wherein the adjustment actuator includes an electrically or hydraulically operated linear actuator.

18. A method, comprising:
receiving user inputs from a user interface positioned in a cab of a vehicle;
controlling operation of an adjustment actuator based on the user inputs; and
moving at least one of a chassis stop or a knuckle stop with the adjustment actuator to adjust a steering limit location.

19. The method of claim 18, wherein the adjustment actuator includes an electrically or hydraulically operated linear actuator that is operable in response to commands from the user interface.

* * * * *